United States Patent
Peng et al.

(10) Patent No.: US 8,968,453 B2
(45) Date of Patent: Mar. 3, 2015

(54) ANTHRAPYRIDONE SULFONIC ACID COMPOUNDS AND THEIR PREPARATION METHODS AND APPLICATIONS

(75) Inventors: Xiaojun Peng, Liaoning (CN); Tao Liu, Liaoning (CN); Jinhe Wu, Liaoning (CN); Rong Zhang, Liaoning (CN); Jingyue Wang, Liaoning (CN); Feng Wang, Guangdong (CN); Shaolei Li, Guangdong (CN); Jianzhou Zhang, Guangdong (CN); Zhengru Yang, Guangdong (CN)

(73) Assignees: Zhuhai Ninestar Management Co., Ltd., Zhuhai, Guangdong (CN); Dalian University of Technology, Dalian, Liaoning (CN)

( * ) Notice: Subject to any disclaimer, the term of this patent is extended or adjusted under 35 U.S.C. 154(b) by 0 days.

(21) Appl. No.: 13/583,282

(22) PCT Filed: Jan. 14, 2011

(86) PCT No.: PCT/CN2011/070263
§ 371 (c)(1),
(2), (4) Date: Nov. 9, 2012

(87) PCT Pub. No.: WO2012/094820
PCT Pub. Date: Jul. 19, 2012

(65) Prior Publication Data
US 2013/0327248 A1    Dec. 12, 2013

(51) Int. Cl.
C09D 11/02     (2014.01)
C09B 5/14      (2006.01)
C09D 11/328    (2014.01)
C09D 11/037    (2014.01)
C09B 62/04     (2006.01)
(Continued)

(52) U.S. Cl.
CPC ............ *C09D 11/328* (2013.01); *C09D 11/037* (2013.01); *C09B 5/14* (2013.01); *C09B 62/04* (2013.01); *C09B 62/465* (2013.01); *C09B 62/503* (2013.01)
USPC .................... 106/31.47; 106/31.58; 546/76

(58) Field of Classification Search
CPC ....... C09D 11/037; C09D 11/328; C09B 5/14
USPC ........ 106/31.47, 31.58; 546/76; 544/209, 212
See application file for complete search history.

(56) References Cited

U.S. PATENT DOCUMENTS 2,962,497 A * 11/1960 Guenthard ............ 544/188
3,632,611 A *  1/1972 Kenmochi et al. ....... 552/224
(Continued)

FOREIGN PATENT DOCUMENTS

JP    2007-224119    9/2007
JP    2008/202011  * 9/2008

Primary Examiner — Helene Klemanski
(74) Attorney, Agent, or Firm — Jackson IPG PLLC

(57) ABSTRACT

The present invention relates to a class of compounds of general formula (I) or their salts of general formula (II):

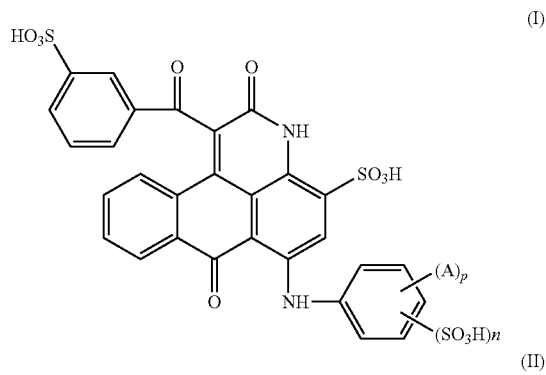

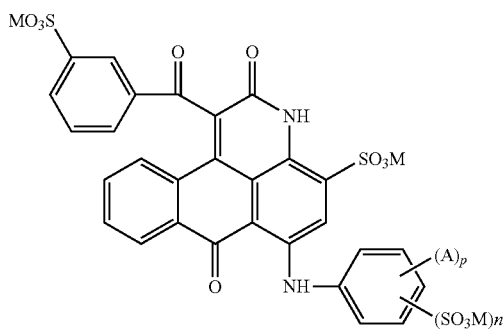

In formula (I)-(II), the substituents (A)p and (SO$_3$H)n on the benzene ring are at the ortho, meta or para position, n is 0-2, and p is 0-3; M is selected from Li$^+$, Na$^+$, K$^+$, NH$_4^+$ or organic ammonium salt N$^+$R$_1$R$_2$R$_3$R$_4$, where R$_1$, R$_2$, R$_3$, R$_4$ are the same or different H, C$_{1-18}$ alkyl groups, cyclohexyl groups, CH$_2$CH$_2$OH, CH(CH$_3$)CH$_2$OH or benzyl groups; where p>0, A stands for the same or different groups selected from: H, CN, NO$_2$, NH$_2$, F, Cl, Br, C$_{1-18}$ alkyl group, cyclohexyl group, phenyl group, benzyl group, phenoxy group, C$_{1-18}$ alkoxy group, C$_{1-18}$ alkylthio group, SO$_2$CH=CH$_2$, SO$_2$CH$_2$CH$_2$A$_1$, NR$_6$COR$_5$ or NR$_6$SO$_2$R$_5$.

19 Claims, No Drawings

(51) Int. Cl.
*C09B 62/465* (2006.01)
*C09B 62/503* (2006.01)

(56) References Cited

U.S. PATENT DOCUMENTS

| | | | | |
|---|---|---|---|---|
| 4,740,581 | A * | 4/1988 | Pruett et al. | 528/289 |
| 6,152,969 | A * | 11/2000 | Matsumoto et al. | 8/658 |
| 6,460,988 | B1 * | 10/2002 | Mafune et al. | 347/100 |
| 6,471,760 | B1 * | 10/2002 | Matsumoto et al. | 106/31.47 |
| 6,511,169 | B1 * | 1/2003 | Gallo et al. | 347/100 |
| 6,645,283 | B1 * | 11/2003 | Matsumoto et al. | 106/31.47 |
| 7,074,265 | B2 * | 7/2006 | Ikesu et al. | 106/31.47 |
| 7,297,196 | B2 * | 11/2007 | Matsumoto et al. | 106/31.47 |
| 7,737,278 | B2 * | 6/2010 | Banning et al. | 546/61 |
| 7,785,411 | B2 * | 8/2010 | Ishii et al. | 106/31.47 |
| 7,828,886 | B2 * | 11/2010 | Baettig et al. | 106/31.47 |
| 7,871,464 | B2 * | 1/2011 | Ono et al. | 106/31.47 |
| 2010/0291360 | A1 * | 11/2010 | Murakami et al. | 428/195.1 |
| 2011/0195238 | A1 * | 8/2011 | Ono et al. | 428/195.1 |
| 2013/0276667 | A1 * | 10/2013 | Peng et al. | 106/31.47 |

\* cited by examiner

ANTHRAPYRIDONE SULFONIC ACID COMPOUNDS AND THEIR PREPARATION METHODS AND APPLICATIONS

FIELD OF THE INVENTION

This invention relates to a class of novel anthrapyridone sulfonic acid compounds, their preparation methods and applications. It especially relates to anthrapyridone sulfonic acid compounds with sulfonic acid substituents introduced and their magenta inkjet ink.

BACKGROUND OF THE INVENTION

Among color recording methods, inkjet printing is one of the typical ones. So far, varieties of ink jetting methods have been developed to form fine ink drops which will be adsorbed on recording materials (e.g., paper, film, fabric, etc.) to achieve the purpose of recording. As the nozzles do not contact the recording materials, so ink jet printers are characterized by quietness as well as ease in realizing miniaturization, high-speed and colorization. Therefore, ink jet printing has been developed rapidly in recent years.

Traditional inks are prepared as follows: Water-soluble dyes are dissolved in aqueous media and water-soluble organic solvents capable of preventing inks from blocking nibs are added to prepare inks for fountain pens and brush pens. Different from traditional inks, inkjet inks requires to be capable of forming high-density images, not blocking nozzles, drying well, bleeding little and being stored stably. In addition, images formed by ink-jet inks must be of water resistance, light resistance, moisture resistance, ozone resistance, solubility, and fastness of these properties.

When applications of ink-jet printers expand from small printers to industrial large printers, higher requirements are raised for fastness of water resistance, moisture resistance, light resistance and gas resistance. Water resistance: Usually the substrate surface may adsorb porous silicon oxide, cationic polymers, alumina sol or special ceramics, and thus if dyes are applied on paper surface together with such organic or inorganic particles as well as PVA resin, water resistance can be significantly improved. Light resistance: In the four primary colors, namely yellow, magenta, cyan and black, magenta has the weakest light resistance and can seriously affect image quality; therefore, it has become an important subject to improve light resistance of magenta dyes. Moisture resistance: If printed images are to be saved in a high-humidity environment, it is required that dyes, as part of recording materials, are of good anti-bleeding fastness. If bleeding of dyes occurs, image quality will be significantly reduced, especially on occasions that high requirements are imposed on colour matching for photos. However, compared with water resistance, improvement of light resistance, moisture resistance, ozone resistance and solubility are more difficult to be realized In addition, with the wide popularity of digital cameras in recent years, the opportunity to print photos at home is increasing. In saving printed products, oxidizing gases in indoor air which causes discoloration of images has also become one of the problems. Oxidizing gases cause discoloration and fading of images by reaction with the dyes on or in the recording paper. Particularly, ozone gas is one of the main materials of promoting oxidization and fading of inkjet printed images, so the improvement of ozone gas resistance has become a subject equally important as the improvement of light resistance.

Typical examples of magenta dyes for inkjet inks include: xanthene type rhodamine dyes and azo dyes derived from H-acid coupling. While rhodamine dyes are most prominent in tone and brightness, they are extremely poor in light resistance. H-acid derived azo dyes are of good lustre and water resistance and meanwhile are of poor light resistance, ozone resistance and brightness; particularly compared with cyan dyes with copper phthalocyanine as the representative and yellow azo dyes, it is still of poor light resistance.

In recent years, magenta dyes of outstanding light resistance have been developed, including anthrapyridone dyes. They have no sulfonic groups on their molecular scaffolds, indicating advantages of brightness, light resistance, ozone resistance, etc.

Examples include patents of Fuji Photo Film: JP2007138124A, JP2007224119A, CN101370882A, WO2009044094A2, US2010080908A1, GB2464188A; patents of Canon: US2002041318A1, US2002036681A1, JP2002069349A, JP2006199922A, CN101298526A, US2007242100A1, US2005057607A1; patents of Epson: US2005115458A1, US2005115459A1, US2007263055A1, US2008257209A1; patents of Avecia: U.S. Pat. No.6,183,549B1, and GB2353533A; Patents of Nippon Kayaku Co., Ltd.: EP0927747A1, JP2000109464A, JP2000191660A, U.S. Pat. No. 6,471,760B1, JP2002332419, U.S. Pat. No. 6,648,952B1, US2004134383A1, EP1626070A1, US2006219131A1, WO2009116243A1, CN101547976A, US2010015410A1 (2010 Jan. 21); Patents of ILFORD: US2010075047A1, etc.

However, dyes revealed in these patents do not meet all requirements of tone, brightness, light resistance, water resistance, ozone resistance as well as solubility and solution stability. Although some improvements in light resistance and ozone resistance have been made in some dyes, the solubility of the dyes and the long-term stability of inkjet inks are still insufficient. Particularly, long-term stability of dyes in inks is associated with their solubility; In many cases, solubility of dyes in water is not ideal, and it is unavoidable to replace M with Li to improve the solubility within a limited range.

SUMMARY OF THE INVENTION

The purpose of this patent is to provide a class of magenta dyes (anthrapyridone sulfonic acid compounds) with improved light resistance, ozone resistance, water resistance as well as outstanding water solubility and long-term stability in inkjet inks.

To solve the mentioned problems, we have found through careful investigation that anthrapyridone sulfonic acid compounds in the form of free acid of general formula (I) or its salts of general formula (II) may be a solution.

The first aspect of the present invention relates to a class of compounds of general formula (I) and its salts of general formula (II).

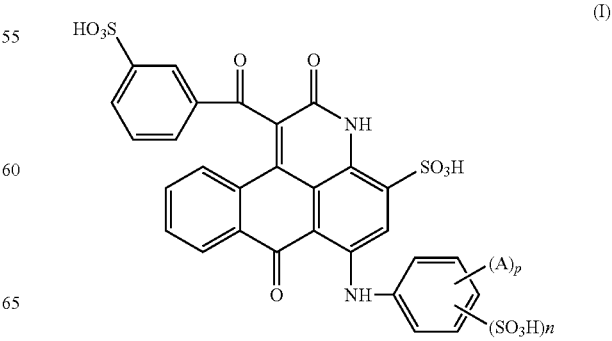

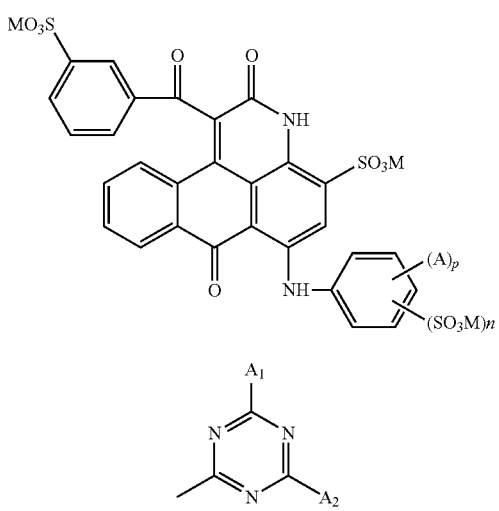

(II)

L

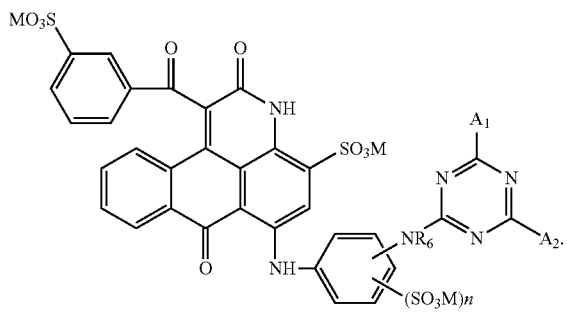

(III)

In the general formula (I) and (II), substituents $(A)_p$ and $(SO_3H)_n$ are at the ortho, meta or para position of the benzene ring with n of 0-2 and p of 0-3;

M is selected from among $Li^+$, $Na^+$, $K^+$, $NH_4^+$ or organic ammonium salt $N^+R_1R_2R_3R_4$, of which $R_1$, $R_2$, $R_3$, $R_4$ are the same or different H, $C_{1-18}$ alkyl group, cyclohexyl group, $CH_2CH_2OH$, $CH(CH_3)CH_2OH$ or benzyl group;

Where p>0, A is the same or different groups selected from: H, CN, $NO_2$, $NH_2$, F, Cl, Br, $C_{1-18}$ alkyl group, cyclohexyl group, phenyl group, benzyl group, phenoxy, $C_{1-18}$ alkoxy group, $C_{1-18}$ alkylthio group, $SO_2CH=CH_2$, $SO_2CH_2CH_2A_1$, $NR_6COR_5$, or $NR_6SO_2R_5$;

Where, $A_1$ stands for O, S, and/or N groups;

$R_5$ stands for $C_{1-18}$ alkyl group, phenyl group, tolylene, benzyl group, $CF_3$, or $(C_6H_{5-m})(CO_2M)_m$, of which m is 0-3, $(C_6H_{5-m})(CO_2M)_m$ is a benzene ring with m number of $CO_2M$ substituents which may be at any position of the benzene ring.

$R_6$ stands for H, $C_{1-4}$ alkyl group or $CH_2CH_2OH$;

$A_2$ and $A_1$ in general formula L have the same definition but $A_2$ and $A_1$ can be the same or different.

In a preferred embodiment, Said organic ammonium salt $N^+R_1R_2R_3R_4$ is selected from: monoethanolamine salt, diethanolamine salt, triethanolamine salt, monoisopropanolamine salt, diisopropanolamine salt or triisopropanolamine salt.

In a preferred embodiment, Said M is selected from among $Li^+$, $Na^+$, or $NH_4^+$.

In another preferred embodiment, Said $A_1$ is OH, $OR_7$, $OSO_3M$, $O(C_6H_{5-m})(CO_2M)_m$, $O(C_6H_{5-m})(SO_3M)_m$, $O(C_{10}H_{9-m})(CO_2M)_m$, $O(C_{10}H_{9-m})(SO_3M)_m$, $NH_2$, $N(R_6)_2$, $NR_6R_7$, $N(R_6)(C_6H_{5-m})(CO_2M)_m$, $N(R_6)(C_6H_{5-m})(SO_3M)_m$, $N(R_6)(C_{10}H_{9-m})(CO_2M)_m$, $N(R_6)(C_{10}H_{9-m})(SO_3M)_m$, SH, $SR_7$, $S(C_6H_{5-m})(CO_2M)_m$, $S(C_6H_{5-m})(SO_3M)_m$, $S(C_{10}H_{9-m})(CO_2M)_m$ or $S(C_{10}H_{9-m})(SO_3M)_m$;

Where, $R_7$ is H, $C_{1-18}$ alkyl group, cyclohexyl group, $CH_2CH_2OH$, $CH(CH_3)CH_2OH$, benzyl group, $CH_2CH_2SO_3M$, $CH_2CH_2CH_2SO_3M$, $CH_2CH_2CH_2CH_2SO_3M$, $CH_2CH_2CO_2M$, $CH_2CH_2CH_2CO_2M$, $CH_2CH_2CH_2CO_2M$, or $CH_2CH_2CH_2CH_2CH_2CO_2M$;

Where, $(C_6H_{5-m})(SO_3M)_m$ is a benzene ring with m number of $SO_3M$ substituents which can be at any position of the benzene ring; $(C_{10}H_{9-m})(CO_2M)_m$ is a naphthalene ring with m number of $CO_2M$ substituents and $(C_{10}H_{9-m})(SO_3M)_m$ is a naphthalene ring with m number of $SO_3M$ substituents, and the substituents $CO_2M$ or $SO_3M$ can be at any position of the naphthalene ring.

The second aspect of the present invention relates to a compound of general formula (III), where the definitions of $A_1$, $A_2$, $R_6$, M and n are the same as the ones in general formula (I)-(II):

The third aspect of the present invention relates to a method for preparing the compound of general formula (I) or its salt of general formula, which consists of the followings steps:

(1) Cyclization: React the raw materials of general formula (IV) with benzoyl ethyl acetate in organic solvents at 100° C.-250° C. for cyclization for 2-10 h to form the compound of general formula (V) (Determination of reaction end: Disappearance of characteristic blue peak in the liquid chromatogram or thin layer chromatograph indicates the end of the reaction), where the mentioned organic solvents are those with boiling point of 100° C.-300° C. and capable of fully or partly solving the raw material (IV).

In the reaction, the byproducts water and ethanol are discharged from the reaction system under the condition of heating reflux or heating evaporation;

Cool the reaction system to 0-50° C. after the cyclization and filter the compound of general formula (V) separated out from the liquid reaction system to obtain the solid intermediate (V).

(2) Sulfonation: Sulfonate the compound of general formula (V) obtained at Step 1 with fuming sulphuric acid $SO_3.H_2SO_4$ containing 5-30% of $SO_3$ or chlorosulfonic acid at 10° C.-100° C. for 1-4 h to obtain the compound of general formula (I).

Determination of reaction end: Control the reaction with liquid chromatogram by the method of ion pair of antiphase and determine the end of the reaction by the peak retention time of the raw material and the sulfonated product.

(3) Salting or salt conversion: Sort out or convert the compound of general formula (1) obtained at Step (2) to form the salt of general formula (II):

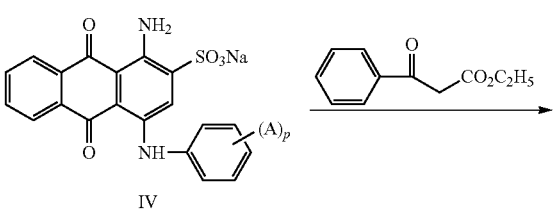

IV

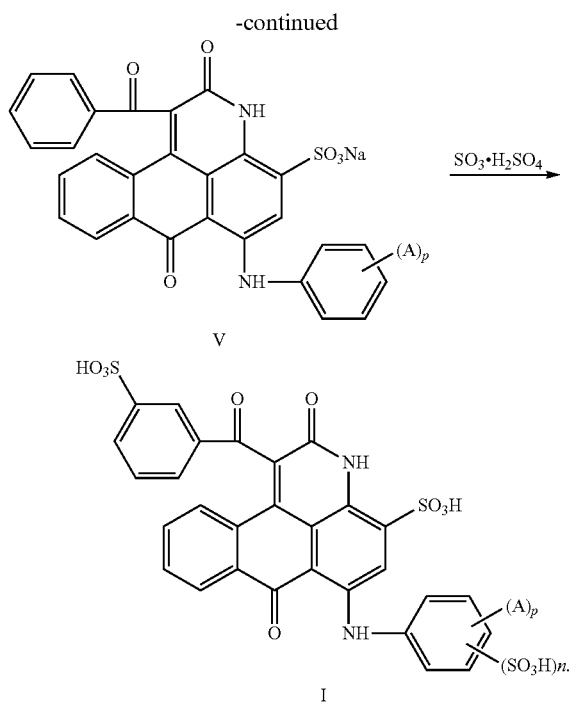

In a preferred embodiment of the foregoing method, the organic solvents used at Step (1) is selected from dimethylbenzene, diethylbenzene, trimethylbenzene, chlorobenzene, dichlorobenzene, nitrobenzene, DMSO, DMF or their mixtures.

In another preferred embodiment of the foregoing method, a sub-step as the following is included at Step (1) after the reaction system cools to 0-50° C.: Add organic solvents solving little of the intermediate (V) with a boiling point of 30° C.-150° C. to promote the separation of the intermediate (V).

In a third preferred embodiment of the foregoing method, the low-boiling point organic solvent is selected from: methanol, ethanol, propanol, isopropanol, acetone, acetonitrile, petroleum ether, cyclohexane, or their mixtures.

In a fourth preferred embodiment of the foregoing method, inorganic salt selected from ammonium chloride, sodium chloride, or lithium chloride is used in the salting out process at Step (3) to form the compound of general formula (II).

The fourth aspect of the present invention relates to a method for preparing the compound of general formula (III), which consists of the following steps:

(1) Blue anthraquinone sulfonic acid compounds of general formula (VI) are used to obtain compounds of general formula (VII)-(VIII) in turn by followings steps (1)-(2) as described in claim 6;

(2) Under acidic conditions of pH<4, heat the obtained compounds of general formula (VIII) to 30° C.-100° C. for hydrolysis to obtain the compound of general formula (VIII-NH2), salt out the resulting compounds with salts containing M cations to obtain the M salt form of the compound;

(3) React the obtained salt form of the compound of general formula (VIII-NH$_2$) with cyanuric chloride at 0-30° C. and pH 2-8 to obtain the compound of general formula (VIII-Cl$_2$);

(4) React the compounds of general formula (VIII-Cl$_2$) with HA$_1$ at pH 4-10 and 5° C.-50° C. to obtain the compound of general formula (VIII-A$_1$Cl);

(5) React the compound of general formula (VIII-A$_1$Cl) with HA$_2$ at pH 3-10 and 30° C.-100° C. to obtain the compound of general formula (III);

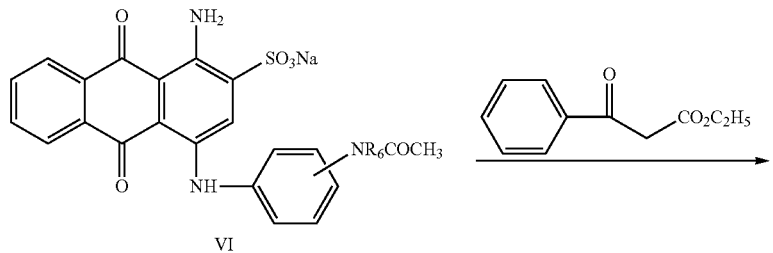

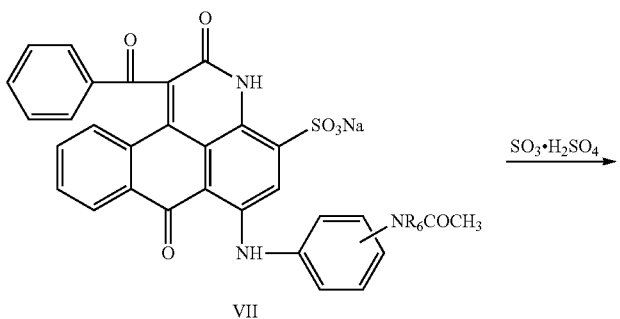

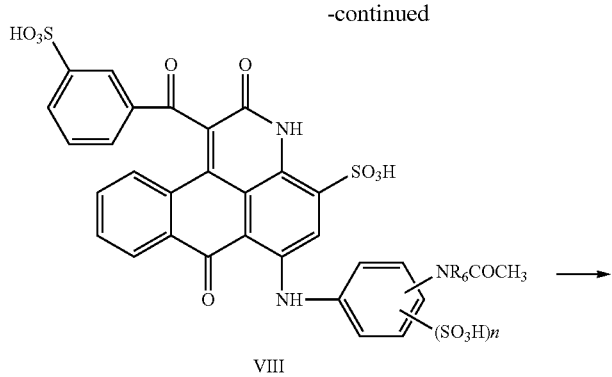
VIII
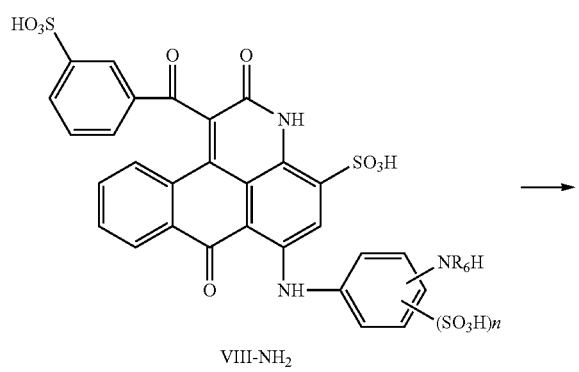
VIII-NH₂
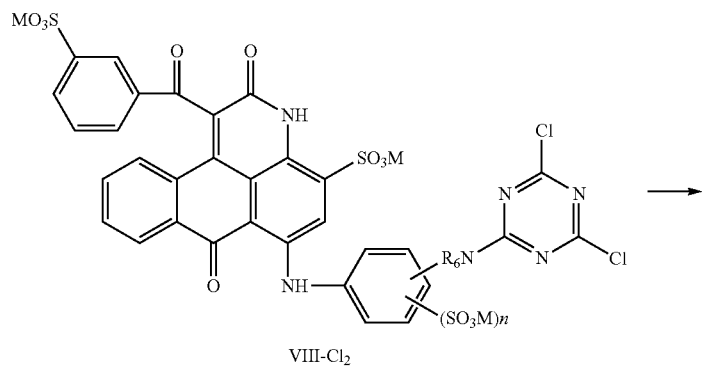
VIII-Cl₂
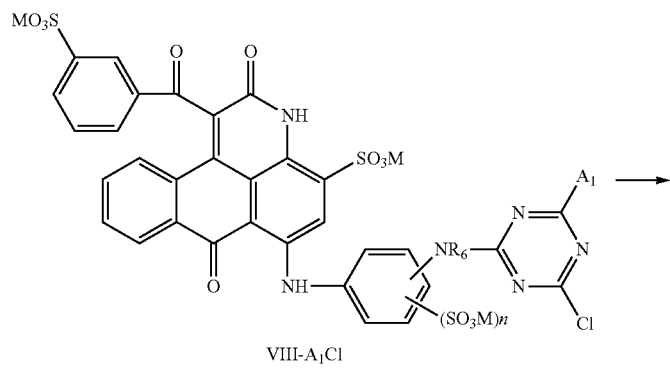
VIII-A₁Cl

-continued

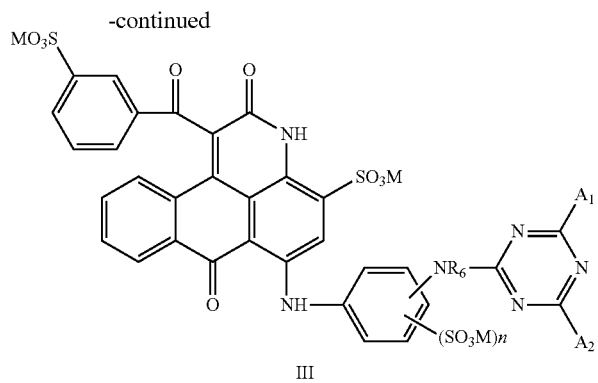

III

The fifth aspect of the present invention relates to a known type of ink, which includes: the compound of general formula (I) or its salts or the compound of general formula (III) of the present invention (Said ink is preferably printing ink, coating ink or inkjet ink; Said inkjet ink is preferably water-based or solvent-based or aqueous solvent-based inkjet ink).

The sixth aspect of the present invention relates to a compound of water-based inkjet ink consisting of 1-20% of the above-mentioned compounds or their salts by weight, 5-50% of organic solvents miscible with water by weight, and 30-94% of water by weight based on the total weight of the compound;

Said water-miscible organic solvent(s) may include one or more of the following: ethanol, propanol, isopropanol, ethylene glycol, diethylene glycol, triethylene glycol, glycerol, ethylene glycol monobutyl ether, diethylene glycol monobutyl ether, triethylene glycol monobutyl ether, propylene glycol, butanediol, pentanediol, hexanediol, diglycerol, 2-pyrrolidone and N-methyl -2-pyrrolidone."

The seventh aspect of the present invention relates to a coating (preferably outdoor coating) which contains the above-mentioned compounds of general formula (I), (II) or (III).

The eighth aspect of the present invention relates to a paint (preferably outdoor paint) which contains the above-mentioned compounds of general formula (I), (II) or (III).

The ninth aspect of the present invention relates to a laser printer toner which contains the above-mentioned compounds of general formula (I), (II) or (III).

The tenth aspect of the present invention relates to a marker which contains the above-mentioned compounds of general formula (I), (II) or (III).

The eleventh aspect of the present invention relates to the applications of above-mentioned compounds of general formula (I), (II) or (III), i.e., a coloring agent for following material: inks, coatings, paints, laser print toners or markers.

The twelfth aspect of the present invention relates to the applications of one of the above-mentioned compounds of general formula (I), (II) or (III), i.e., a coloring agent for the following materials: paper, fabric (preferably woven fabrics, knitted fabrics or non-woven fabrics), glass, ceramics or polymers (preferably rubber, plastic or fiber).

The present invention has the following characteristics:

1) Compounds of general formula (I)-(III) have such structural characteristics: Sulfonic acid groups are introduced to the core of substituted 4-amino-anthracene-pyridone to increases the water-solubility;

2) The introduction of sulfonic acid groups reduces the electron cloud density of parent dye molecules and further improves the light resistance and ozone resistance;

3) In the preparation methods described in the present invention, blue dye derivatives of commercially available bromamine acid are used as basic raw materials for synthesis, which is thus characterized by convenience in operation and low costs. The currently available patent techniques take compounds free of sulfonic groups as the starting materials, which require higher costs and more reaction steps.

The introduction of sulfonic groups, which are electron absorptive and water soluble, not only reduces the electron cloud density of molecules and improves photooxidation resistance and ozone resistance of compounds, but also improves the solubility of dyes and the long-term stability of dyes in inks;

In the preparation methods described in the present invention, industrially massively produced bromamine acid is used as the parent of dyes, so that the process is shortened and costs reduced.

Dye compounds of the present invention are prominent in water solubility and lustre and brightness suitable for inkjet printing. The fastness of light resistance, moisture resistance and ozone resistance of images printed with inkjet inks prepared by the involved dye compounds are outstanding, and high brightness tone can be achieved on inkjet recording materials.

Specific Embodiments

Anthrapyridone sulfonic acid compounds of general formula (I) of the present invention are characterized by brightness and extremely light tones on inkjet recording paper, outstanding water solubility and good filterability on the filter membrane. In addition, ink compositions containing the compound is subject to no crystal precipitation, physical changes and color changes in long-term preservation and thus features good storage stability and can present photo-tone color images truthfully in long term; even images printed on the surface (inorganic particle coating) of special paper of photo quality (film) are of good fastness of light resistance, ozone resistance and moisture resistance and thus long-term storage stability.

The present invention related to a class of anthrapyridone sulfonic acid compounds of general formula (I), where sulfonic acid groups are introduced to the core of substituted 4-amino-anthrapyridone.

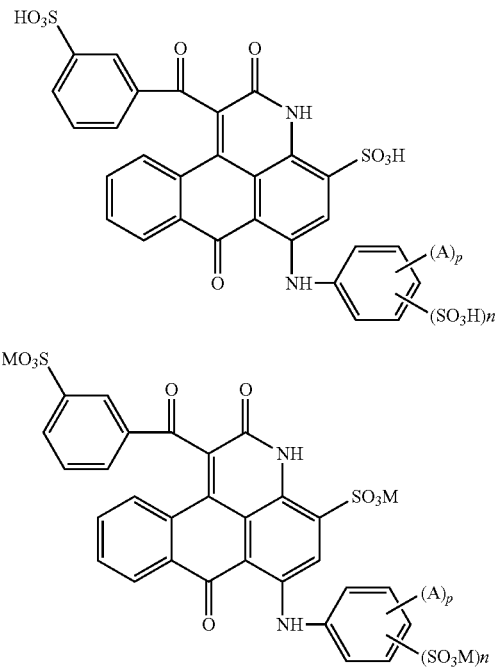

In general formula (I), (A) p and ($SO_3H$) n can be at different positions on the benzene ring. n is 0-2; p is 0-3. n is preferably O-2 and more preferably 2; p is preferably 0-3.

In actual application, free sulfonic groups contained in the compound of general formula (I) are generally in the form of cation (M) salts of sulfonic acid with structural general formula (II).

In general formula (II), M is preferably selected from $Li^+$, $Na^+$, $K^+$, $NH_4^+$ or organic ammonium salt $N^+R_1R_2R_3R_4$. $R_1$, $R_2$, $R_3$, $R_4$ are the same of different H, $C_{1-18}$ alkyl group, cyclohexyl group, $CH_2CH_2OH$, $CH(CH_3)CH_2OH$, or benzyl group.

The mentioned organic ammonium salt $N^+R_1R_2R_3R_4$ is preferably selected from: monoethanolamine salt, diethanolamine salt, triethanolamine salt, monoisopropanolamine salt, diisopropanolamine salt, triisopropanolamine salt.

M is preferably $Li^+$, $Na^+$, $K^+$, $NH_4^+$, etc. and more preferably $Li^+$, $Na^+$, $NH_4^+$.

In general formula (I) and (II), A is the same or different groups at all the positions (ortho, meta, para) of benzene ring and selected from: H, CN, $NO_2$, $NH_2$, F, Cl, Br, $C_{1-18}$ alkyl group, cyclohexyl group, phenyl group and benzyl group. Phenoxy group, $C_{1-18}$ alkoxy group, $C_{1-18}$ alkylthio group, $SO_2CH=CH_2$, $SO_2CH_2CH_2A_1$, $NRCOR_5$, or $NRSO_2R_5$.

A group is preferably H, $SO_2CH=CH_2$, $SO_2CH_2CH_2A_1$, $NRCOR_5$, or $NRSO_2R_5$.

$A_1$ stands for groups consisting of O, S, N, preferably containing phenol, sulfhydryl groups and more preferably containing sulfhydryl groups. Specific examples include but not limited to: OH, $OR_7$, $OSO_3M$, $O(C_6H_{5-m})(CO_2M)_m$, $O(C_6H_{5-m})(SO_3M)_m$, $O(C_{10}H_{9-m})(CO_2M)_m$, $O(C_{10}H_{9-m})(SO_3M)_m$, $NH_2$, $N(R_6)_2$, $NR_6R_7$, $N(R_6)(C_6H_{5-m})(CO_2M)_m$, $N(R_6)(C_6H_{5-m})(SO_3M)_m$, $N(R_6)(C_{10}H_{9-m})(CO_2M)_m$, $N(R_6)(C_{10}H_{9-m})(SO_3M)_m$, SH, $SR_7$, $S(C_6H_{5-m})(CO_2M)_m$, $S(C_6H_{5-m})(SO_3M)_m$, $S(C_{10}H_{9-m})(CO_2M)_m$, or $S(C_{10}H_{9-m})(SO_3M)_m$; m is 0-3 and preferably 0-2.

$A_1$ is more preferably OH, $NH_2$, $NR_6R_7$, SH, $SR_7$. Further preferably OH, $SR_7$.

Where, $(C_6H_{5-m})(CO_2M)_m$ stands for benzene ring containing m number of $CO_2M$ substituents, and $(C_6H_{5-m})(SO_3M)_m$ stands for benzene ring containing m number of $SO_3M$ substituents; the substituents $CO_2M$ or $SO_3M$ can be at any position of the benzene ring, e.g., ortho, meta or para position.

Similarly, $(C_{10}H_{9-m})(CO_2M)_m$ stands for naphthalene ring containing m number of $CO_2M$ substituents and $(C_{10}H_{9-m})(SO_3M)_m$ stands for naphthalene ring containing m number of $SO_3M$ substituents; the substituents $CO_2M$ or $SO_3M$ can be at any position of the naphthalene ring.

Where, $R_5$ stands for $C_{1-18}$ alkyl groups, phenyl groups, tolylene groups (ortho, meta or para), benzyl groups, $CF_3$ or $(C_6H_{5-m})(CO_2M)_m$ and preferably $C_{1-12}$ alkyl groups, phenyl groups and $CF_3$.

$R_6$ stands for H, $C_{1-4}$ alkyl groups or $CH_2CH_2OH$; preferably H and methyl groups.

$R_7$ is H, $C_{1-18}$ alkyl group, cyclohexyl group, $CH_2CH_2OH$, $CH(CH_3)CH_2OH$, benzyl group, $CH_2CH_2SO_3M$, $CH_2CH_2CH_2SO_3M$, $CH_2CH_2CH_2CH_2SO_3M$, $CH_2CH_2CO_2M$, $CH_2CH_2CH_2CO_2M$, $CH_2CH_2CH_2CH_2CO_2M$ or $CH_2CH_2CH_2CH_2CH_2CO_2M$.

$R_7$ is preferably H, $CH_2CH_2SO_3M$, $CH_2CH_2CH_2SO_3M$, $CH_2CH_2CH_2CH_2SO_3M$, $CH_2CH_2CO_2M$, $CH_2CH_2CH_2CO_2M$, $CH_2CH_2CH_2CH_2CO_2M$ or $CH_2CH_2CH_2CH_2CO_2M$ and more preferably H, $CH_2CH_2SO_3M$, $CH_2CH_2CH_2SO_3M$ or $CH_2CH_2CH_2CH_2SO_3M$.

Where A in general formula (I) or (II) is $NR_6$-L, a dye compound of general formula (III) is formed; $A_1$ and $A_2$ in general formula L may be the same or different, and the definition of $A_2$ is the same as above $A_1$ mentioned.

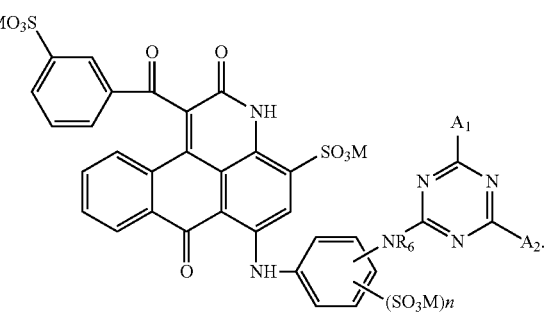

Synthesis of Compounds of General Formula (I)-(II)

In preparation of the compound of the present invention, other than the practice of using compounds free of sulfonic groups as the starting materials, low-cost compounds of general formula (V) containing sulfonic groups are used as the basic raw material in preparation of the compound of general formula (I) or (II) of the present invention, which are cyclized in organic solvents to form the compound of general formula (V) and then sulfonated to form the compound of general formula (I) and finally salted out or converted to the compound of general formula (II).

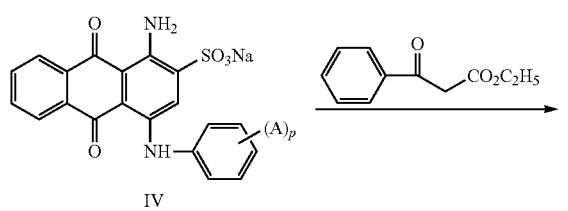

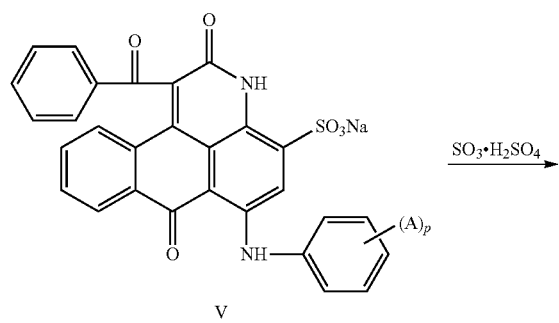

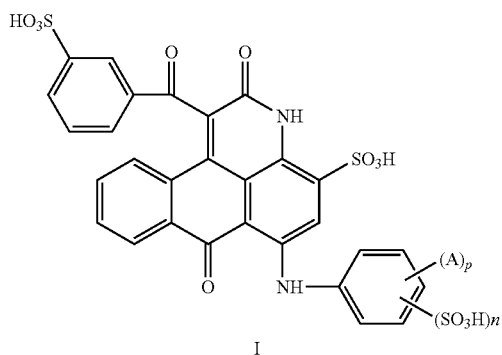

At the cyclization step, the compound of general formula (IV) reacts with benzoyl ethyl acetate in organic solvents with boiling point of 100° C.-300° C. at 100° C.-250° C. for 2-10 h to form the compound of general formula (V), where the byproducts ethanol and water are removed by heating reflux or heating evaporation to accelerate the reaction.

Water segregator is used to remove the resulting byproducts water and ethanol from the reflux condenser to promote the reaction.

The end of the cyclization can be determined by regular industrial methods, e.g., liquid chromatography or thin layer chromatography. Disappearance of characteristic blue peak of the raw material (IV) in the liquid chromatogram indicates the end of the reaction.

No special restrictions are placed on the molar ratio of the compound (IV) and benzoyl ethyl acetate in cyclization. The molar ratio may be 1:1-100, preferably 1:1-50, 1:1-25, 1:2-15, 1:2-10 and 1:2-5.

Benzoyl ethyl acetate, as one of the raw materials for the reaction, can also be directly used as the reaction solvent. In this case, the consumption of benzoyl ethyl acetate will be greater.

Organic solvents used in the cyclization reaction should be capable of dissolving or partly dissolving the raw material (IV) to accelerate the reaction. The byproducts water and ethanol can be discharged from the reaction system by evaporation.

The boiling point of the involved organic solvents is 100-300° C., preferably 140-250° C. and more preferably 140-200° C.

Said organic solvents include but not limited to: toluene, all isomers of dimethylbenzene and its isomer mixture, all isomers of trimethylbenzene and its isomer mixture, all isomers of diethylbenzene and its isomer mixture, all isomers of triethylbenzene and its isomer mixture, petroleum ether, ethylene glycol dimethyl ether, ethylene glycol diethyl ether, ethylene glycol dipropyl ether, ethylene glycol dibutyl ether, 1,2-propylene glycol dimethyl ether, 1,2-propylene glycol diethyl ether, 1,2-propylene glycol dipropyl ether, 1,2-propylene glycol dibutyl ether, diethylene glycol dimethyl ether, diethylene glycol diethyl ether, diethylene glycol dipropyl ether, diethylene glycol dibutyl ether, chlorobenzene, all isomers of dichlorobenzene, mixed dichlorobenzene, dimethyl sulfoxide (DMSO), dimethyl formamide, N-methylpyrrolidone, sulfolane, and mixture of the above solvents.

Said organic solvents may preferably include: dimethylbenzene, diethylbenzene, trimethylbenzene, chlorobenzene, dichlorobenzene, trichlorobenzene, nitrobenzene, DMSO, DMF, 2-pyrrolidone, NMP, sulfolane and their mixture.

Said organic solvents may most preferably include: dimethylbenzene isomer mixture, o-dichlorobenzene, mixture of dimethylbenzene and DMSO and mixture of o-dichlorobenzene and DMSO.

Temperature for the cyclization reaction is 100-250° C., preferably 100-200° C. and more preferably 130-190° C.

The reaction temperature may be increased or regulated under pressure or vacuum conditions, which can adopt atmospheric pressure of 0.5-5 atm.

The cyclization reaction time is preferably 2-8 h, more preferably 5 h and further more preferably 2-4 h.

Cool the reaction system to 0-50° C. (preferably 0-30° C.) after the cyclization and filter the compound of general formula (V) separated out from the liquid reaction system to obtain the solid intermediate (V).

During or after the reaction system cools down, add low-boiling point organic solvents (preferably organic solvents with low solubility of the intermediate (V) and boiling points of 30° C.-150° C.) to promote full separation of the intermediate (V).

Said low boiling point organic solvents include but not limited to: methanol, ethanol, propanol, isopropanol, acetone, methyl ethyl ketone, ethyl ether, tetrahydrofuran, dioxane, dichloromethane, chloroform, carbon tetrachloride, cyclohexane, petroleum ether, ethyl acetate, methyl acetate, butyl acetate, isobutyl acetate, sec-butyl acetate, ethyl formate, propyl formate, butyl formate, isobutyl formate, sec.-butyl formate or their mixtures.

Said low-boiling point organic solvents preferably include methanol, ethanol, propanol, isopropanol, acetone, acetonitrile, petroleum ether, cyclohexane, or their mixtures, and more preferably include methanol, ethanol, propanol, isopropanol or their mixtures.

Alkalis may be added during cyclization to promote the reaction. Said alkalis may include but not limited to sodium carbonate, sodium bicarbonate, potassium carbonate, potassium bicarbonate, lithium carbonate, lithium bicarbonate, ammonium carbonate, ammonium bicarbonate, sodium phosphate, disodium hydrogen phosphate, potassium phosphate, dipotassium hydrogen phosphate, ammonium phosphate, diammonium hydrogen phosphate, lithium phosphate, dilithium hydrogen phosphate, sodium acetate, potassium acetate, lithium acetate, ammonium acetate, sodium oxalate, potassium oxalate, lithium oxalate, ammonium oxalate, sodium hydroxide, potassium hydroxide, aluminum hydroxide and lithium hydroxide.

Said alkalis may preferably include sodium carbonate and sodium bicarbonate.

Dosage of alkalis: The molar ratio of compound (IV) and alkalis is 1:0.1-20, preferably 1:0.5-10, more preferably 1:0.5-5, and further more preferably 1:0.5-2.5.

Sulfonation of the intermediate (V): Sulfonate the compound (V) with fuming sulphuric acid ($SO_3 \cdot H_2SO_4$) containing 5-30% of $SO_3$ or chlorosulfonic acid at 10° C.-100° C. for 1-4 h to obtain the compound of general formula (I).

Sulfonation of the intermediate (V): Sulfonate the intermediate with fuming sulphuric acid or chlorosulfonic acid by stirring.

Where fuming sulphuric acid is used for sulfonation, the $SO_3$ content in the fuming sulphuric acid is 5-30%, preferably 5-15%, more preferably 6-13% and the most preferably 7-12%.

In the present invention, the weight ratio of the dry intermediate (V) to fuming sulphuric acid is 1:5-50, preferably 1:20, more preferably 1:15 and further preferably 1:10.

The temperature for sulfonation with fuming sulphuric acid is preferably 10-100° C. and more preferably 40-90° C.

Where chlorosulfonic acid is used for sulfonation, no specific restrictions are placed on the dosage ratio of the intermediate (V) to chlorosulfonic acid, preferably the molar ratio of the dry intermediate (V) to chlorosulfonic acid preferably 1:3-50 and more preferably 1:5-30.

The temperature for sulfonation with chlorosulfonic acid is preferably 20-100° C., more preferably 10-80° C. and further more preferably 20-60° C.

The reaction time is preferably 2-4 h and more preferably 3-4 h, after which the reaction ends.

The end of the reaction can also be determined by regular industrial methods, e.g., liquid chromatography or thin layer chromatography. Liquid chromatography: Using the method of ion pair of antiphase, determine the end of the reaction by the peak retention time of the raw material and the sulfonated product.

Cool down the sulfonated products after the end of the sulfonation reaction. Salt out or convert the products.

In a preferred embodiment, sulfonated products are poured into ice water after the sulfonation reaction by stirring and controlling the temperature below 40° C. Salt out or convert the products.

Salting out and salt conversion of compound (I) can be done according to the regular industrial practice.

In a preferred embodiment, inorganic salts may be use to salt out the compound of general formula (I) to obtain salt (II). Said inorganic salts may preferably include but not limited to ammonium chloride, sodium chloride, lithium chloride, etc., or their mixtures.

In a preferred specific embodiment, sodium chloride or ammonium chloride can be added into the sulfonated products which have been poured into the ice water for cooling down for multiple times of salting out to obtain the salt of general formula (II).

The specific steps are as described below. For example, after salting out with table salt sodium chloride and filtering, wet cake of sodium salt can be obtained. Dissolve the wet cake in water, add hydrochloric acid to adjust the pH value to 1-2, and filter the solution to obtain crystals and thus compounds of general formula I or II in the form of free acids (or part of which is direct sodium salt). Stir the wet cake of the free acids with water, add alkalis such as potassium hydroxide, lithium hydroxide, ammonia, organic amines and so on for neutralization, and then add salts for salting to obtain potassium salt, lithium salt, ammonium salt or organic ammonium salt correspondingly. Among these salts, lithium salt, sodium salt and ammonium salt are preferred.

Synthesis of the Compound of General Formula (III)

Synthesis of the compound consists of the followings steps:

Prepare the compound of general formula (VII) and (VIII) from blue anthraquinone sulfonic acid compound (VI) by the same steps of cyclization and sulfonation for preparation of the compound of general formula (I) as described above.

Under acidic conditions of pH<4, heat the compound (VIII) to 30° C.-100° C. for hydrolysis to obtain general formula VIII-$NH_2$; sort out the compound VIII-$NH_2$ with salts containing M cations to obtain the M salt form of the compound;

React the obtained salt form of the compound (VIII-$NH_2$) with cyanuric chloride at pH 2-8 and 0-30° C. to obtain compound of general formula (VIII-$Cl_2$);

(4) React the compound of general formula (VIII-$Cl_2$) with $HA_1$ at pH 4-10 and 5° C.-50° C. to obtain the compound of general formula (VIII-$A_1$Cl);

React the compound of general formula (VIII-$Cl_1$) with $HA_2$ at pH 3-10 and 30° C.-100° C. to obtain the compound of general formula (III);

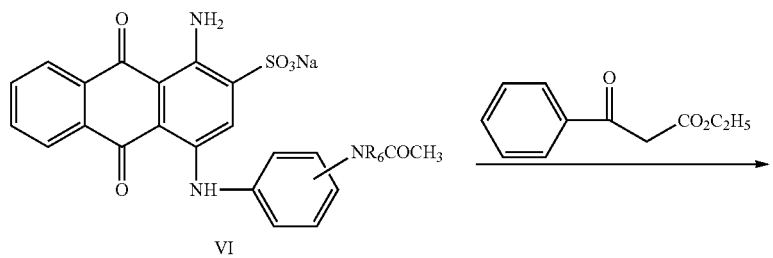

VI

-continued
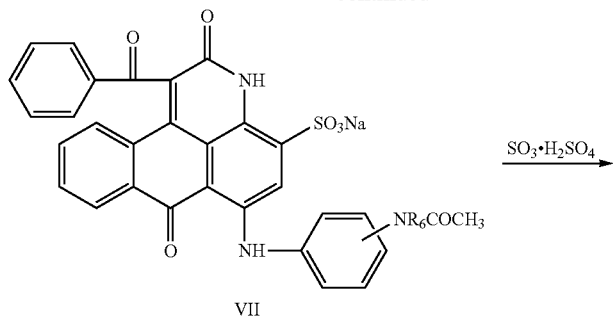
VII
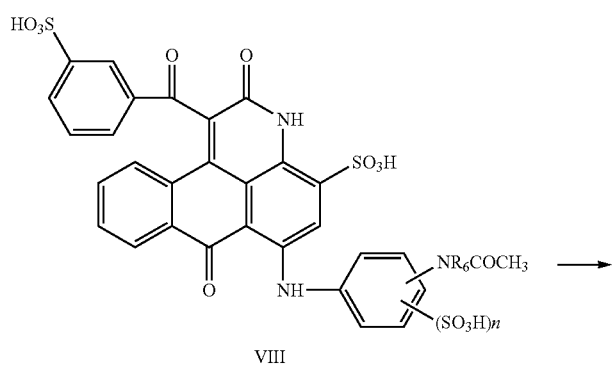
VIII
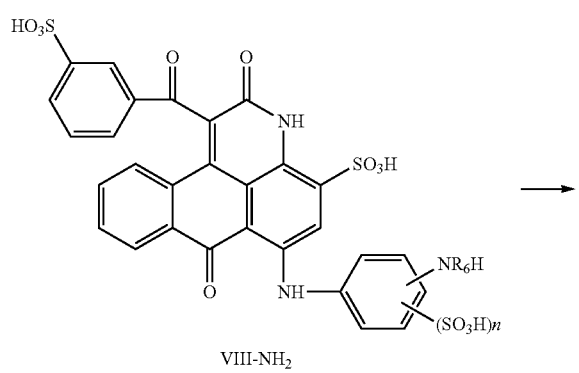
VIII-NH$_2$
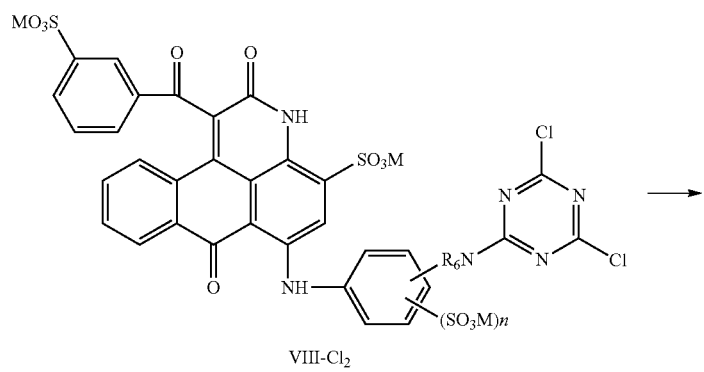
VIII-Cl$_2$

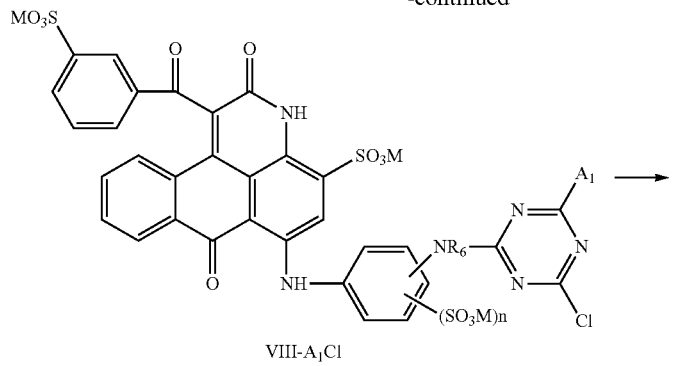

VIII-A₁Cl

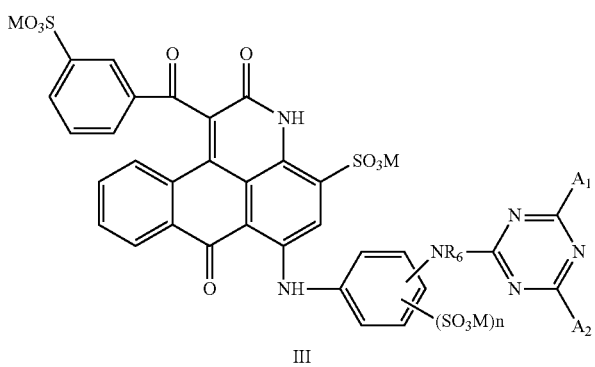

III

As described above, preparation of the dye compound of general formula III includes cyclization and sulfonation of the starting material, i.e., the blue dye compound (VI) to obtain the intermediate compound VII and VIII in turn. Then the magenta dye compound VIII is taken as the starting material to react with water, cyanuric chloride, HA₁ and HA₂ to obtain compound III.

At the hydrolyzation step, it is preferred that the compound (VIII) reacts with water at acids with pH<4, including but not limited to sulfuric acid, hydrochloric acid, sulfonic acid, phosphoric acid, acetic acid and so on. The acids preferably include sulfuric acid, sulfonic acid or hydrochloric acid, and more preferably sulfuric acid, dilute sulphuric acid or sulfonic acid.

The hydrolyzation temperature is 30-100° C., preferably 40-90° C., more preferably 50-80° C., further more preferably 60-70° C. and the most preferably 60-65° C.

Salt out the products of hydrolyzation to obtain the amino compound VIII-NH₂ in its M salt form. The salting-out process can be done with regular salts containing M cations (e.g., sodium chloride) by regular industrial methods. The definition of M is the same as that of above.

Then, react the compound VIII-NH₂ in its M salt form with cyanuric chloride to obtain the dichloro compound (VIII-Cl₂). No specific restrictions are placed on the dosage ratio of the two raw materials in the reaction, an approximate molar ratio of 1:1 preferred.

A specific example of cyanuric chloride is 2,4,6-trichloro-S-triazine.

In the reaction with cyanuric chloride, pH is preferably 3-8, the temperature is preferably 0-20° C. and more preferably 0-10° C.

The reaction time is preferably 2-8 h, and more preferably 3-7 h.

React the obtained intermediate dichloro compound (VIII-Cl₂) with HA₁ to obtain the compound (VIII-A₁Cl).

The reaction raw material HA₁ may preferably contain phenol and sulfhydryl groups, and more preferably contain sulfhydryl groups.

Phenols contained in HA₁ may preferably be those containing carboxyl substituents, e.g., hydroxybenzoic acid, hydroxy is ophthalic acid, hydroxybenzenesulfonic acid, in which the substituents may be at the ortho, meta or para position on the benzene ring.

Specific examples of HA₁ containing sulfhydryl groups include but not limited to mercaptoethanol, 3-thiohydracrylic acid, etc.

In the reaction with HA₁, pH value is preferably 4-9; the reaction temperature is preferably 10° C.-50° C., more preferably 20° C.-50° C. and further more preferably 30-50° C. The reaction time is generally 10 min to 5 h, preferably 30 min to 3 h.

React the resulting compound (VIII-A₁Cl) with HA₂ (the same as or different from HA₁) at pH 4-10, preferably 5-9 and 50° C.-100° C. preferably 60° C.-90° C. The reaction time is generally 10 min to 5 h, preferably 30 min to 3 h, and dye of general formula III is obtained.

Blue compounds (IV) and (VI) used as raw materials in the above described methods of the present invention are generally prepared from the reaction of bromamine acid (i.e., 1-amino-4-bromo-9,10-anthraquinone-2-sulfonic acid) and the corresponding arylamines with cupric salts as catalysts in the presence of sodium carbonate in water or organic solvents by heating. A lot of compounds of general formula (IV) and (VI) have been industrialized and commercially available. For example, the following blue acid dyes and blue reactive dyes can be directly used as raw materials:

C.I. acid blue 25
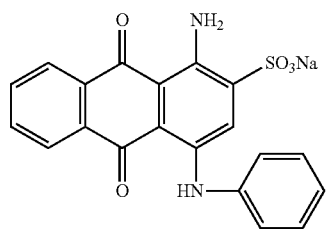
C.I. acid blue 27
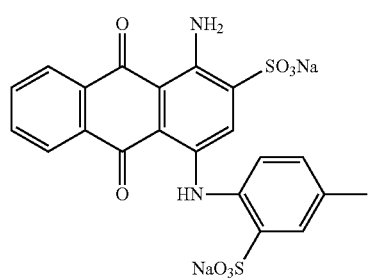
C.I. acid blue 40
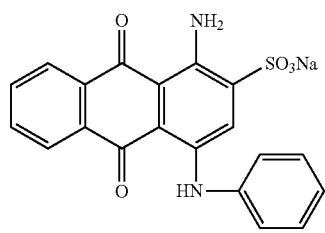
C.I. acid blue 41
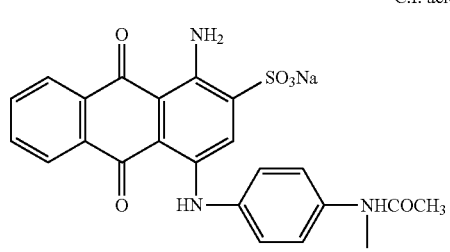
C.I. acid blue 129
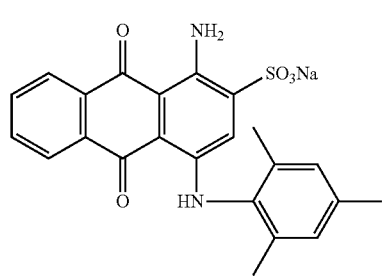
C.I. acid blue 129:1
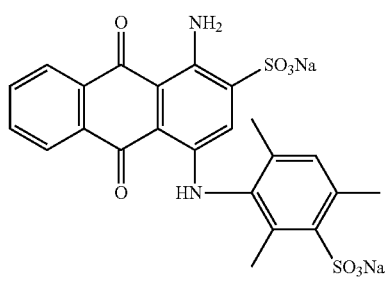
-continued
C.I. acid blue 182
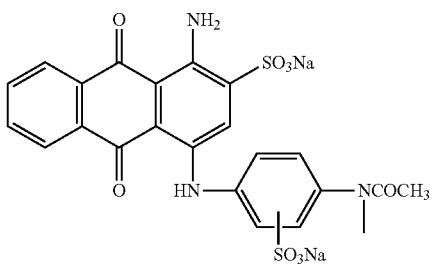
C.I. acid blue 138
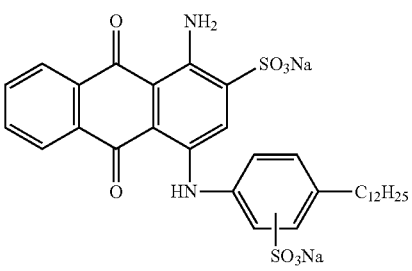
C.I. acid blue 140
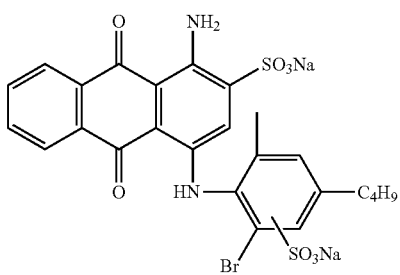
C.I. acid blue 183
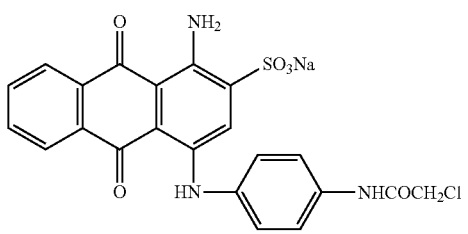
C.I. acid blue 230
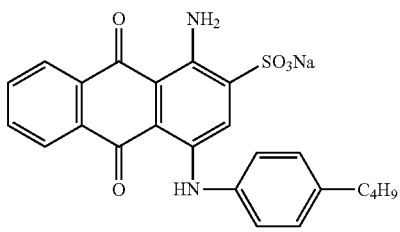

C.I. acid blue 225
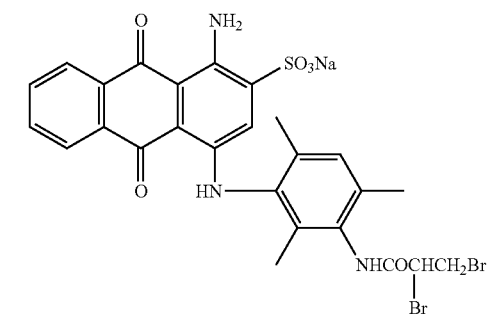
C.I. acid blue 264
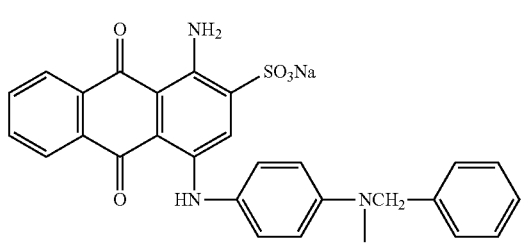
C.I. acid blue 264
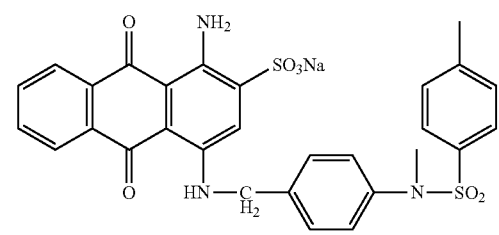
C.I. acid blue 277
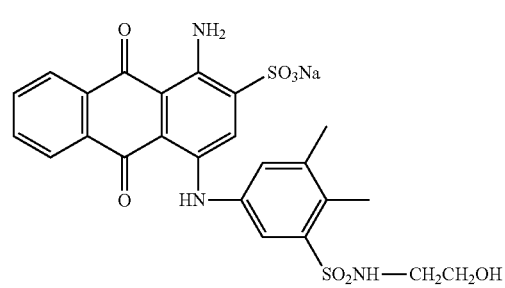
C.I. acid blue 324
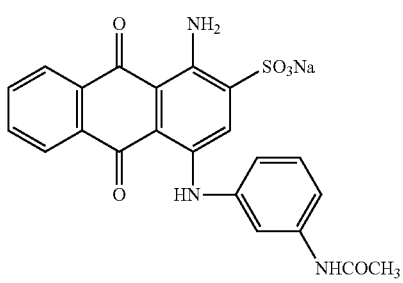
C.I. acid blue 350
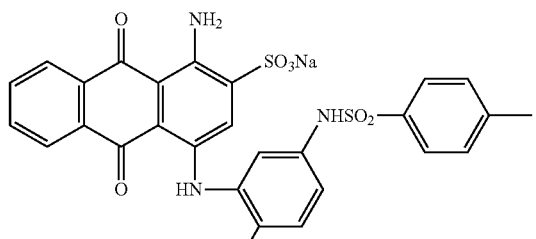
C.I. Reactive blue 5
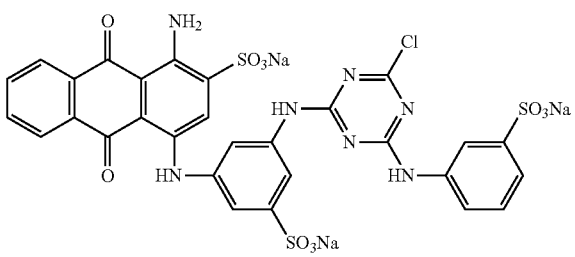
C.I. Reactive blue 19
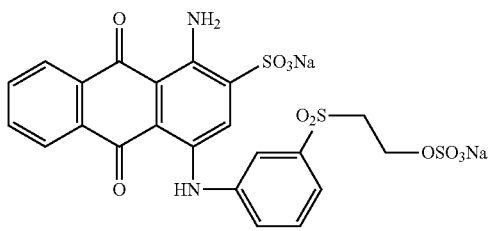
C.I. Reactive blue 49
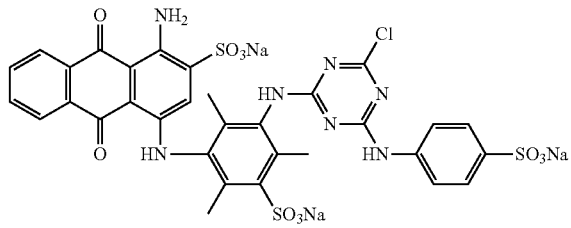
C.I. Reactive blue 74
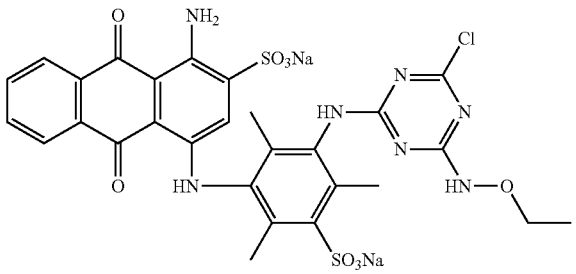
Specific examples of compounds of general formula (I) - (II) include the following (the present invention is not limited to compounds of these structures):"

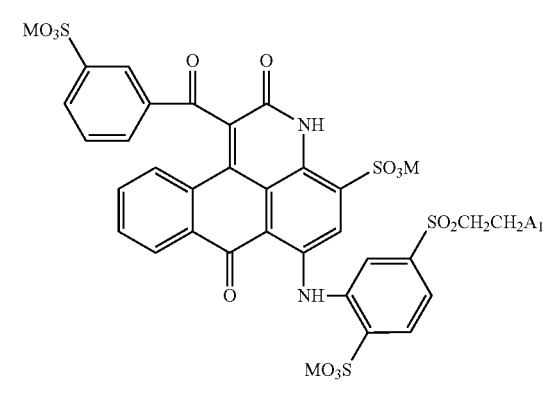

B $A_1$ = $SCH_2CH_2CH_2SO_3M$
$NHCH_2CH_2SO_3M$
$N(CH_3)CH_2CH_2SO_3M$
$N(CH_2CH_3)_2$

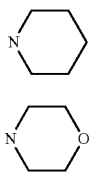

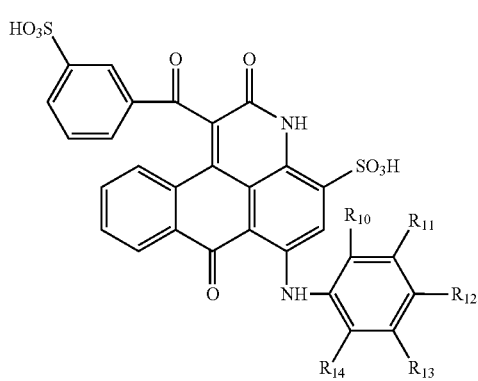

TABLE 1

Examples of Structures of Class C Dyes (Sulfonic groups and their salts, carboxy groups and their salts indicated in free acids)

| Dyes | $R_{10}$ | $R_{11}$ | $R_{12}$ | $R_{13}$ | $R_{14}$ |
|---|---|---|---|---|---|
| 1 | H | $SO_3H$ | $CH_3$ | H | $SO_3H$ |
| 2 | $CH_3$ | $SO_3H$ | $CH_3$ | H | $CH_3$ |
| 3 | H | $SO_3H$ | $CH_2CH_2CH_2CH_3$ | H | $SO_3H$ |
| 4 | H | $SO_3H$ | $SO_3H$ | H | $SO_3H$ |
| 5 | H | $NHCOCH_3$ | $SO_3H$ | H | $SO_3H$ |
| 6 | H | $SO_3H$ | $NHCOCH_3$ | H | $SO_3H$ |
| 7 | H | $SO_3H$ | $NCH_3COCH_3$ | H | $SO_3H$ |

Specific examples of dye compounds of general formula III prepared with Dye 5 in Table 1 as the intermediate by methods described above may include but not limited to those listed in Table 2 (general formula D).

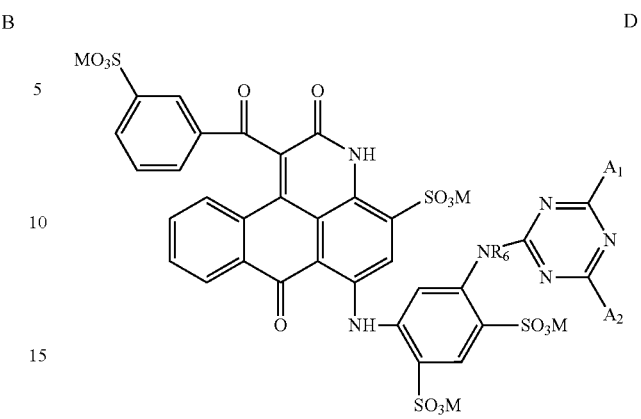

D

TABLE 2

Specific Examples of Class D Dye Compounds

1: $R_6$ = H, $A_1$ = $N(CH_2CH_2OH)_2$, $A_2$ =. $N(CH_2CH_2OH)_2$
2: $R_6$ = H, $A_1$ = $NHCH_2CH_2OH$, $A_2$ =. $NHCH_2CH_2OH$
3: $R_6$ = H, $A_1$ = $N(CH_2CH_2OH)_2$, $A_2$ =. $SCH_2CH_2CH_2SO_3M$
4: $R_6$ = H, $A_1$ = $N(CH_2CH_2OH)_2$, $A_2$ =. $NHCH_2CH_2OH$
5: $R_6$ = H, $A_1$ = $N(CH_2CH_2OH)_2$, $A_2$ =. $N(CH_2CH_2OH)_2$
6: $R_6$ = H, $A_1$ = $N(CH_2CH_2OH)_2$, $A_2$ =. p-$NHC_6H_4SO_3M$
7: $R_6$ = H, $A_1$ = $N(CH_2CH_2OH)_2$, $A_2$ =. m-$NHC_6H_4SO_3M$
8: $R_6$ = H, $A_1$ = $N(CH_2CH_2OH)_2$, $A_2$ =. $NHC_6H_3$-2,5-$(SO_3M)_2$
9: $R_6$ = H, $A_1$ = $SCH_2CH_2CH_2SO_3M$, $A_2$ =. $SCH_2CH_2CH_2SO_3M$
10: $R_6$ = H, $A_1$ = $SCH_2CH_2CH_2SO_3M$, $A_2$ =. p-$NHC_6H_4SO_3M$
11: $R_6$ = H, $A_1$ = $SCH_2CH_2CH_2SO_3M$, $A_2$ =. m-$NHC_6H_4SO_3M$
12: $R_6$ = H, $A_1$ = $SCH_2CH_2CH_2SO_3M$, $A_2$ =. $NHC_6H_3$-2,5-$(SO_3M)_2$
13: $R_6$ = H, $A_1$ = $OC_6H_3$-3,5-$(CO_2M)_2$, $A_2$ =. $N(CH_2CH_2OH)_2$
14: $R_6$ = H, $A_1$ = $OC_6H_3$-3,5-$(CO_2M)_2$, $A_2$ =. $SCH_2CH_2CH_2SO_3M$
15: $R_6$ = H, $A_1$ = $OC_6H_3$-3,5-$(CO_2M)_2$, $A_2$ =. $OC_6H_3$-3,5-$(CO_2M)_2$
16: $R_6$ = H, $A_1$ = p-$OC_6H_4SO_3M$, $A_2$ =. $N(CH_2CH_2OH)_2$
17: $R_6$ = H, $A_1$ = p-$OC_6H_4SO_3M$, $A_2$ =. $SCH_2CH_2CH_2SO_3M$
18: $R_6$ = H, $A_1$ = p-$OC_6H_4SO_3M$, $A_2$ =. p-$OC_6H_4SO_3M$
19: $R_6$ = $CH_3$, $A_1$ = $N(CH_2CH_2OH)_2$, $A_2$ =. $N(CH_2CH_2OH)_2$
20: $R_6$ = $CH_3$, $A_1$ = $SCH_2CH_2CH_2SO_3M$, $A_2$ =. $SCH_2CH_2CH_2SO_3M$
21: $R_6$ = $CH_3$, $A_1$ = p-$OC_6H_4SO_3M$, $A_2$ =. $N(CH_2CH_2OH)_2$
22: $R_6$ = $CH_3$, $A_1$ = p-$OC_6H_4SO_3M$, $A_2$ =. $SCH_2CH_2CH_2SO_3M$
23: $R_6$ = $CH_3$, $A_1$ = p-$OC_6H_4SO_3M$, $A_2$ =. p-$OC_6H_4SO_3M$

Specific examples of dye compounds of general formula III prepared with Dye 7 compounds in Table 1 as the intermediate by methods described above may include but not limited to those listed in Table 3 (general formula E).

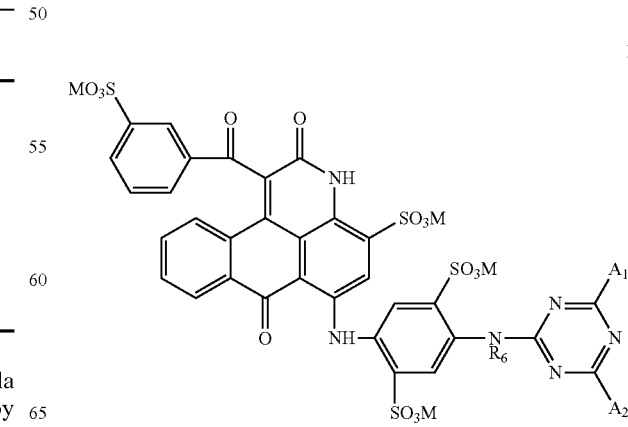

E

TABLE 3

Examples of Structures of Class E Dyes

1: $R_6$ = H, $A_1$ = N(CH$_2$CH$_2$OH)$_2$, $A_2$ =. N(CH$_2$CH$_2$OH)$_2$
2: $R_6$ = H, $A_1$ = NHCH$_2$CH$_2$OH, $A_2$ =. NHCH$_2$CH$_2$OH
3: $R_6$ = H, $A_1$ = N(CH$_2$CH$_2$OH)$_2$, $A_2$ =. SCH$_2$CH$_2$CH$_2$SO$_3$M
4: $R_6$ = H, $A_1$ = N(CH$_2$CH$_2$OH)$_2$, $A_2$ =. NHCH$_2$CH$_2$OH
5: $R_6$ = H, $A_1$ = N(CH$_2$CH$_2$OH)$_2$, $A_2$ =. N(CH$_2$CH$_2$OH)$_2$
6: $R_6$ = H, $A_1$ = N(CH$_2$CH$_2$OH)$_2$, $A_2$ =. p-NHC$_6$H$_4$SO$_3$M
7: $R_6$ = H, $A_1$ = N(CH$_2$CH$_2$OH)$_2$, $A_2$ =. m-NHC$_6$H$_4$SO$_3$M
8: $R_6$ = H, $A_1$ = N(CH$_2$CH$_2$OH)$_2$, $A_2$ =. NHC$_6$H$_3$-2,5-(SO$_3$M)$_2$
9: $R_6$ = H, $A_1$ = SCH$_2$CH$_2$CH$_2$SO$_3$M, $A_2$ =. SCH$_2$CH$_2$CH$_2$SO$_3$M
10: $R_6$ = H, $A_1$ = SCH$_2$CH$_2$CH$_2$SO$_3$M, $A_2$ =. p-NHC$_6$H$_4$SO$_3$M
11: $R_6$ = H, $A_1$ = SCH$_2$CH$_2$CH$_2$SO$_3$M, $A_2$ =. m-NHC$_6$H$_4$SO$_3$M
12: $R_6$ = H, $A_1$ = SCH$_2$CH$_2$CH$_2$SO$_3$M, $A_2$ =. NHC$_6$H$_3$-2,5-(SO$_3$M)$_2$
13: $R_6$ = H, $A_1$ = OC$_6$H$_3$-3,5-(CO$_2$M)$_2$, $A_2$ =. N(CH$_2$CH$_2$OH)$_2$
14: $R_6$ = H, $A_1$ = OC$_6$H$_3$-3,5-(CO$_2$M)$_2$, $A_2$ =. SCH$_2$CH$_2$CH$_2$SO$_3$M
15: $R_6$ = H, $A_1$ = OC$_6$H$_3$-3,5-(CO$_2$M)$_2$, $A_2$ =. OC$_6$H$_3$-3,5-(CO$_2$M)$_2$
16: $R_6$ = H, $A_1$ = p-OC$_6$H$_4$SO$_3$M, $A_2$ =. N(CH$_2$CH$_2$OH)$_2$
17: $R_6$ = H, $A_1$ = p-OC$_6$H$_4$SO$_3$M, $A_2$ =. SCH$_2$CH$_2$CH$_2$SO$_3$M
18: $R_6$ = H, $A_1$ = p-OC$_6$H$_4$SO$_3$M, $A_2$ =. p-OC$_6$H$_4$SO$_3$M
19: $R_6$ = CH$_3$, $A_1$ = N(CH$_2$CH$_2$OH)$_2$, $A_2$ =. N(CH$_2$CH$_2$OH)$_2$
20: $R_6$ = CH$_3$, $A_1$ = SCH$_2$CH$_2$CH$_2$SO$_3$M, $A_2$ =. SCH$_2$CH$_2$CH$_2$SO$_3$M
21: $R_6$ = CH$_3$, $A_1$ = p-OC$_6$H$_4$SO$_3$M, $A_2$ =. N(CH$_2$CH$_2$OH)$_2$
22: $R_6$ = CH$_3$, $A_1$ = p-OC$_6$H$_4$SO$_3$M, $A_2$ =. SCH$_2$CH$_2$CH$_2$SO$_3$M
23: $R_6$ = CH$_3$, $A_1$ = p-OC$_6$H$_4$SO$_3$M, $A_2$ =. p-OC$_6$H$_4$SO$_3$M

In preparation of the compound of general formula (III), the compound (VIII-NH$_2$) obtained in hydrolyzation may go through acylation reaction with acyl chloride or acid anhydride at 0-80° C. instead of reaction with cyanuric chloride. In this reaction, compounds of general formula (I) with A groups as NR$_6$COR$_5$ or NR$_6$SO$_2$R$_5$ may be obtained.

Said acyl chlorides or acid anhydrides are used as acylating agent, including but not limited to: C$_{1-18}$ alkyl acyl chloride, C$_{1-18}$ alkyl sulfonyl chloride, benzoyl chloride, benzenesulfonyl chloride, p-toluenesulfonyl chloride, chloroacetyl chloride, dichloroethanoyl chloride, trichloroacetyl chloride, C$_{2-6}$ acid anhydride, succinic anhydride, maleic anhydride, glutaric anhydride, trifluoroacetic anhydride, phthalic anhydride, etc.

Dyes of general formula F and G can be obtained from the acylation reaction, specific examples of which include but not limited to those listed in Table 4 and Table 5:

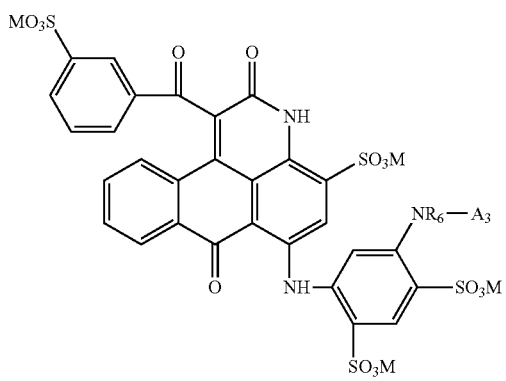

F

TABLE 4

Examples of Class F Dye Compounds

1: $R_6$ = H, $A_3$ = CO—C$_6$H$_5$
2: $R_6$ = H, $A_3$ = SO$_2$—C$_6$H$_5$
3: $R_6$ = H, $A_3$ = p-SO$_2$—C$_6$H$_4$—CH$_3$

TABLE 4-continued

Examples of Class F Dye Compounds

4: $R_6$ = H, $A_3$ = SO$_2$—CH$_3$
5: $R_6$ = H, $A_3$ = CO—CF$_3$
6: $R_6$ = H, $A_3$ = CO—CH$_2$Cl
7: $R_6$ = H, $A_3$ = CO—CHCl$_2$
8: $R_6$ = H, $A_3$ = CO—CCl$_3$
9: $R_6$ = H, $A_3$ = CO—CH$_2$CH$_2$CO$_2$M
10: $R_6$ = CH$_3$, $A_3$ = CO—C$_6$H$_5$
11: $R_6$ = CH$_3$, $A_3$ = SO$_2$—C$_6$H$_5$
12: $R_6$ = CH$_3$, $A_3$ = p-SO$_2$—C$_6$H$_4$—CH$_3$
13: $R_6$ = CH$_3$, $A_3$ = SO$_2$—CH$_3$
14: $R_6$ = CH$_3$, $A_3$ = CO—CF$_3$
15: $R_6$ = CH$_3$, $A_3$ = CO—CH$_2$Cl
16: $R_6$ = CH$_3$, $A_3$ = CO—CHCl$_2$
17: $R_6$ = CH$_3$, $A_3$ = CO—CCl$_3$
18: $R_6$ = CH$_3$, $A_3$ = CO—CH$_2$CH$_2$CO$_2$M

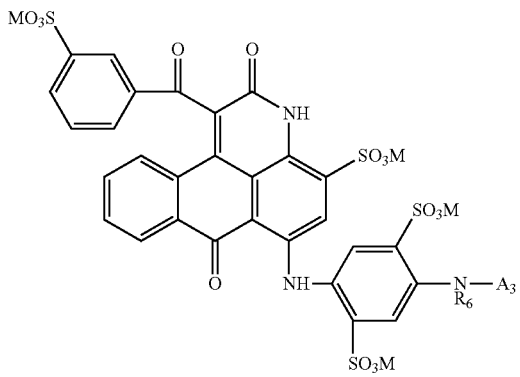

G

TABLE 5

Examples of Class G Dye Compounds

1: $R_6$ = H, $A_3$ = CO—C$_6$H$_5$
2: $R_6$ = H, $A_3$ = SO$_2$—C$_6$H$_5$
3: $R_6$ = H, $A_3$ = p-SO$_2$—C$_6$H$_4$—CH$_3$
4: $R_6$ = H, $A_3$ = SO$_2$—CH$_3$
5: $R_6$ = H, $A_3$ = CO—CF$_3$
6: $R_6$ = H, $A_3$ = CO—CH$_2$Cl
7: $R_6$ = H, $A_3$ = CO—CHCl$_2$
8: $R_6$ = H, $A_3$ = CO—CCl$_3$
9: $R_6$ = H, $A_3$ = CO—CH$_2$CH$_2$CO$_2$M
10: $R_6$ = CH$_3$, $A_3$ = CO—C$_6$H$_5$
11: $R_6$ = CH$_3$, $A_3$ = SO$_2$—C$_6$H$_5$
12: $R_6$ = CH$_3$, $A_3$ = p-SO$_2$—C$_6$H$_4$—CH$_3$
13: $R_6$ = CH$_3$, $A_3$ = SO$_2$—CH$_3$
14: $R_6$ = CH$_3$, $A_3$ = CO—CF$_3$
15: $R_6$ = CH$_3$, $A_3$ = CO—CH$_2$Cl
16: $R_6$ = CH$_3$, $A_3$ = CO—CHCl$_2$
17: $R_6$ = CH$_3$, $A_3$ = CO—CCl$_3$
18: $R_6$ = CH$_3$, $A_3$ = CO—CH$_2$CH$_2$CO$_2$M

The inorganic salt content of the above described dye compounds of general formula (I) and (II) is preferably below 1% by weight. General process like high pressure reverse osmosis membrane can be used for desalination of the dyes.

The ink composition of the present invention is prepared by dissolving compounds of general formula (I) and (II) into water or aqueous solvents (water containing the following water-soluble organic solvents). Dosage of dyes of the present invention is generally 0.1-20% by weight, preferably 1-20%, more preferably 1-15%, and further more preferably 2-10%.

The ink composition of the present invention also contains 0-50% of water soluble or water-miscible organic solvents by weight, preferably 5-50%, and 0-5% of ink control agents by weight. The rest component is water. The above proportions are based on the total weight of the above components.

Specific examples of water soluble or water-miscible organic solvents of the present invention include: C1 to C4 alkanol such as methanol, ethanol, 1-propanol, isopropanol, butanol, isobutanol, sec-butanol, tert-butanol, etc.; carboxylic acid amides such as N,N-dimethylformamide or N,N-dimethylacetamide, etc.; lactams such as 2-pyrrolidone, N-methyl-2-pyrrolidone, etc.; nitrogen-containing cyclic solvents such as 1,3-dimethyl-2-imidazolidinone or 1,3-dimethyl-hexahydro-pyrimidine-2-ketone, etc; ketones such as acetone, methyl ethyl ketone, 2-methyl-2-hydroxyvalerate-4-ketone, etc.; cyclic ethers such as tetrahydrofuran, dioxane, etc.; ethylene glycol, 1,2- or 1,3-propanediol, 1,2- or 1,4-butanediol, 1,6-hexanediol. Monomers and oligomers with (C2 to C6) alkylidene units, e.g., diethylene glycol, triethylene glycol, tetraethylene glycol, dipropylene glycol, sulfur glycol, polyethylene glycol, polypropylene glycol or polyalkylene glycol or thioglycol, etc.; polyols (triols) such as glycerol, hexane-1,2,6-triol, etc.; C1 to C4 alkyl ethers of polyols such as ethylene glycol monomethyl ether or ethylene glycol monoethyl ether, diethylene glycol monomethyl ether, diethylene glycol monoethyl ether, triethylene glycol monomethyl ether, triethylene glycol monoethyl ether, etc.; γ-butyrolactone or methyl sulfoxide, etc. These organic solvents can be used alone or in combination.

In these solvents, 2-pyrrolidone, N-methyl-2-pyrrolidone, ethylene glycol, diethylene glycol or triethylene glycol and dipropylene glycol are preferred; 2-pyrrolidone, N-methyl-2-pyrrolidone and diethylene glycol are more preferred.

Specific examples of ink control agents: anticorrosives, anti-mildew agents, pH adjusting agents, chelating reagent, rust inhibitors, water-soluble UV absorbers, water soluble polymers, dye solvents, surface active agents.

Examples of antiseptic antimildew agents: organic sulfurs, organic nitrogen sulfurs, organic halogens, allyl sulfone halides, iodine propargyls, N-alkyl sulfide halides, nitriles, pyridines, 8-hydroxyquinoline, benzothiazoles, isothiazolizones, dithiols, pyridine oxides, nitropropanes, organic tins, phenols, quaternary ammonium salts, triazines, thiadiazines, anilides, adamantanes, dithiocarbamates, hydrindone bromizes, benzyl bromacetates, inorganic salts, etc. Examples of organic halogen compounds: sodium pentachlorophenol; examples of pyridine oxide compounds: 2-pyridyl mercaptan-1-sodium oxide; examples of inorganic salt compounds: anhydrous sodium acetate; examples of isothiazolines: 1,2-benzisothiazoline-3-ketone, 2-octyl-4-isothiazoline-3-ketone, 5-chloro-2-methyl-4-isothiazoline-3-ketone, 5-chloro-2-methyl-4-isothiazoline-3-ketone magnesium chloride, 5-chloro-2-methyl-4-isothiazoline-3-ketone calcium chloride, 2-methyl-4-isothiazoline-3-ketone calcium chloride. Other antiseptic antimildew agents include: sodium sorbic acid, sodium benzoate, etc.

pH adjusting agent is any substance to control pH of the ink between 7.0 and 11.0. Examples include: alkanols such as diethanolamine, triethanolamine, etc.; alkali metal hydroxides such as lithium hydroxide, sodium hydroxide, potassium hydroxide, etc.; ammonium hydroxide or ammonia; or alkali metal carbonates such as lithium carbonate, sodium carbonate, potassium carbonate, etc. Among these pH adjusting agents, ammonia is preferred.

Examples of chelating reagents include: sodium ethylene diamine tetracetate, nitro sodium triacetate, sodium hydroxyethyl ethylenediamine triacetate, diethylenetriaminepentaacetic acid pentasodium salt, dialuramide sodium diacetate, etc.

Examples of rust inhibitors include: acid sulfite, sodium thiosulfate, ammonium thioglycolate, nitrosodiisopropylamine, pentaerythritol tetranitrate, dicyclohexylamine nitrite, etc.

Examples of water-soluble UV absorbers include: sulfonated benzophenone or sulfonated benzotriazole, etc.

Examples of water soluble polymers include: polyvinyl alcohol, cellulose derivatives, polyamines, polyimine, etc.

Examples of dye solvents include: urea, 8-caprolactam, diethyl carbonate, etc.

Examples of surfactants include: anionic surfactants, amphoteric surfactants, cationic surfactants, non-ionic surfactants, etc. Examples of the anionic surfactant are cited such as: alkyl sulfonamide carboxylic acid salt, α-olefin sulfonates, polyoxyethylene alkyl ether acetates, N-acyl amino acid and its salts. N-acyl methyl taurine, citronellic soap, castor oil sulfate, ammonium lauryl sulfate, alkylphenol type phosphate, alkyl type phosphate, alkylallyl sulfonate, diethyl sulfosuccinate, diethylhexyl sulfosuccinate, dioctyl sulfosuccinate, etc. Examples of cationic surfactants may include: 2-vinylpyridine derivatives, poly-4-vinylpyridine derivatives, etc. Examples of amphoteric surfactant include: lauryl dimethylaminoacetic acid betaine, 2-alkyl-N-carboxymethyl-N-hydroxyethyl imidazoline onium betaine, coco fatty amidepropyldimethylamieno acetic acid betaine, other imidazoline derivatives polyoctyl polyaminoethyl glycine, etc., Examples of non-ionic surfactants include: ethers such as polyoxyethylene nonylphenyl ether, polyoxyethylene octylphenyl ether, polyoxyethylene laurylphenyl ether, polyoxyethylene octylphenyl ether, polyoxyethylene oil-based ether, polyoxyethylene lauryl ether, polyoxyethylene alkyl ether, etc; esters such as polyoxyethylene oleic acid, polyoxyethylene oleic acid ester, polyoxyethylene distearate, sorbitan laurate, sorbitan monostearate, sorbitan monooleate, sorbitan sesquioleate, polyoxyethylene monooleate, polyoxyethylene stearate, etc; 2,4,7,9-tetramethyl-5-decyne 4,7-diol, 3,6-dimethyl-4-octyne-3,6-diol, alkyl acetylenic diols such as 3,5-dimethyl-1-hexyne-diol (e.g., Surfynol 104, 82, 465, Olfine STG, etc., manufactured by Rixin Chemicals), etc. These ink control agents can be used alone or in combination.

The ink composition of the present invention is prepared by dissolving the dye compounds of general formula (I) and (II) into water or the above described aqueous solvents (water containing organic solvents) or water-miscible organic solvents with the above described ink control agents as necessary.

No specific restrictions are placed on the order of dissolution of the components in the above manufacturing methods. The dyes can be preliminarily dissolved in water or the above described aqueous solvents (water containing organic solvents) with addition of ink control agents, or the dyes can be firstly dissolved in water followed by addition of aqueous solvents and ink control agents. Other orders are allowed. The ink composition can also be manufactured by adding aqueous solvents and ink control agents to the solution prepared from reaction liquid containing the dyes or solution containing the pigments via reverse osmosis membrane treatment. Water used for preparation of the ink composition is preferably ion exchange water or deionized water with less impurities such as distilled water. Membrane filter can be used for microfiltration to remove inclusions. The filter membrane pore size is generally 1 micron to 0.01 micron, preferably 0.8 microns to 0.2 microns.

The water-soluble anthrapyridone magenta ink composition is suitable for sealing, photocopying, marking, note-taking, drawing, stamping or printing, especially for ink-jet printing. The advantages include that the resulting images have excellent resistance to water, sunlight, ozone and friction, can also be used for toning, in particular, for composition of blackness.

The dye compounds of general formulas (I) and (II) can be used as coloring agents for paper, fiber or cloth (cellulose, nylon, wool, etc.), leather, color filter substrate, etc. Examples of coloring methods include: printing methods such as dip dyeing, printing and dyeing, screen printing, etc., and ink-jet printing method, among which ink-jet printing method is preferred.

Examples of recording media applicable for ink-jet printing method of the present invention include: thin sheets for information transmission such as paper, films and so on, fibers, leather, etc. Thin sheets for information transmission are generally subject to surface treatment and an ink-absorbing layer is set in their substrate. The ink-absorbing layer can be formed by dipping or coating cations and other polymers on the above mentioned substrate, and the coating contains porous silica, alumina sol or special ceramics, etc.; these white inorganics are coated on the above described substrates together with polyvinyl alcohol, polyvinylpyrrolidone or other hydrophilic polymers. Thin sheets coated with such ink absorbing layer are generally referred to as special inkjet paper (film) or glossy paper (film), e.g., professional glossy paper, top-class glossy paper, glossy paper (Canon), photo glossy paper, glossy packing paper, superfine special glossy film (Epson), high-quality lustering paper, high-quality glossy film, optical paper (HP), etc. In addition, the ink-jet printing method of the present invention is naturally applicable for ordinary paper.

Generally, images printed on substrates coated with porous white inorganics are subject to significant discoloration caused by ozone. Due to the outstanding resistance to gases, the water-based magenta ink composition of the present invention has a special effect on printing on such substrates.

Examples of porous white inorganics include: calcium carbonate, kaolin, talc, clay, diatomaceous earth, synthetic amorphous silica, aluminum silicate, magnesium silicate, calcium silicate, aluminum hydroxide, alumina, lithopone stone, zeolite, barium sulfate, calcium sulfate, titanium dioxide, zinc sulfide, zinc carbonate, etc.

In ink-jet printing, in addition to common-used yellow and cyan ink composition, green ink composition, orange ink composition, blue (or purple) ink composition, and magenta ink composition are available. The dye compound of the present invention can be used to prepare magenta ink composition. These color compositions can be used in combination where necessary to prepare black ink composition. The different color ink compositions are filled into corresponding ink cartridges, which are installed at the established position of the inkjet printer for printing. Examples of ink-jet printers include: piezoelectric printer, thermal bubble jet printer, etc.

The magenta ink composition of the present invention is bright magenta in color and shows highly bright tone on glossy inkjet paper as well as high fastness of printed images and security to human health.

No precipitation or separation will occur to the ink composition of the present invention during storage. The ink will not block the nozzles in ink-jet printing, either. Even used by continuous ink-jet printers for a relatively long fix time or intermittently, the ink of the present invention is subject to no changes of physical properties.

DETAILED DESCRIPTION OF THE PREFERRED EMBODIMENTS

Embodiments are provided below to detail the present invention. Unless otherwise specified, "portion" and "%" involved in this application are based on weight.

Embodiment 1

(1) Add 100 portions of dimethyl sulfoxide to 300 portions of o-dichlorobenzene, and while stirring, add 128 portions of derivatives (sodium salt, see formula B1-1 for its free sulfonic acid) of (C.I. Reactive Blue 19), 7.5 portions of sodium carbonate and 180 portions of benzoyl ethyl acetate and heat the mixture up. React the mixture at 170 to 175° C. for 6 h, where water and ethanol produced as byproduct during the reaction are discharged from the reaction system by azeotropic distillation; the color will gradually turns from blue to purple and determine the end of the reaction with a liquid chromatograph (about 6 h). Cool down the mixture to below 30° C. and add 400 portions of isopropanol and stir it for 30 min; filter and separate out the precipitates, wash with 500 portions of isopropanol and dry the precipitates to obtain 145 portions of pink purple crystalline. It is a sodium salt of formula B1-2, and B1-2 is its free sulfonic acid form. Its maximum absorption in water is 552 nm; mass spectrum: m/z(−): 375.1 ([$\underline{M}$-2H]$^{2-}$/2]), 751.1 ([$\underline{M}$-H]$^{-1}$), 773.1 ([$\underline{M}$-2H+ Na]$^{-}$). The most abundant precise molecular mass (M) of the intermediate dye product B1-2 (calculated by free sulfonic acid) is 752.1.

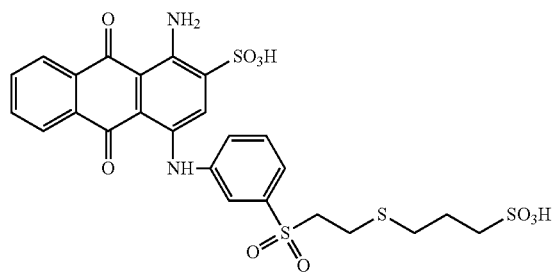

B1-1

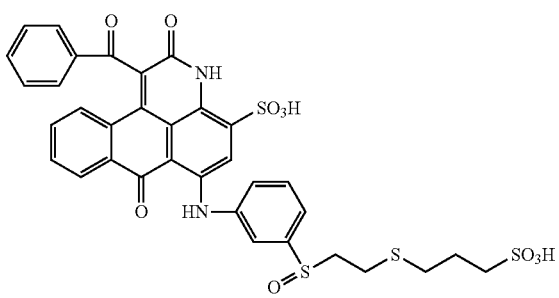

B1-2

(2) After the mixture cools down, add 380.0 portions of 50% fuming sulphuric acid to 450 portions of 95.0% while stirring to obtain 830 portions 10% fuming sulphuric acid. After the mixture cools down, add 136 portions of sodium salt of the above described compound (B1-2) and heat it up. Conduct sulfonation reaction at 40-45° C. for 4 h. After the reaction liquid cools down, slowly pour it to 1,200 portions of ice water while stirring and controlling the temperature below 40° C.; add 750 portions of calcium hydroxide and maintain the temperature below 40° C. with ice blocks, filter the generated calcium sulfate and wash with a small amount of water. Add 260 portions of barium chloride to the resulting filtrate and stir for 30 min; filter the generated barium sulfate and wash with a small amount of water. Adjust the pH value of the filtrate to 9-10 with 30% sodium hydroxide in ice water bath and obtain about 2,600 portions of solution containing 145 portions of dyes (sodium salt; its free sulfonic acid is as indicated by formula B1). The maximum absorption wavelength of dye B1 in water is 533 nm. Mass spectrum (EI-MS) m/z (−): 231.1 ([$\underline{M}$-4H]$^{4-}$/4=253), 308.4 ([$\underline{M}$-3H]$^{3-}$/3), 926.9 ([M-H]$^{-1}$). The most abundant precise molecular mass (M) of dye B1 (calculated by free sulfonic acid) is 928.0.

B1

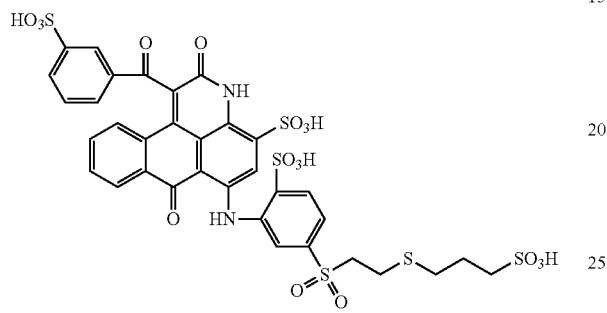

Prepare the sodium salt dye of B2 (B2 is its free sulfonic acid form) with B2-1 as the raw material by the same method as described above. The maximum absorption wavelength of the dye in water is 533 nm. Mass spectrum (EI-MS) m/z (−): 284.0 ([$\underline{M}$-3H]$^{3-}$/3), 421.5 ([$\underline{M}$-2H]$^{2-}$/2), 844.1 ([M-H]$^{-1}$). The most abundant precise molecular mass (M) of dye B2 (calculated by free sulfonic acid) is 845.1.

B2-1

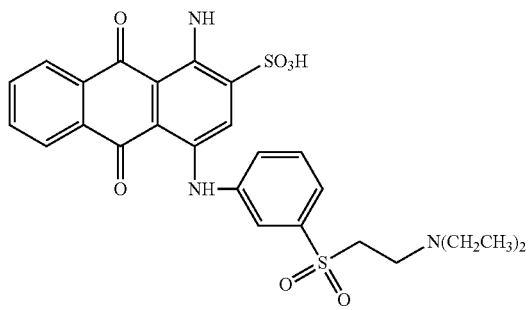

B2

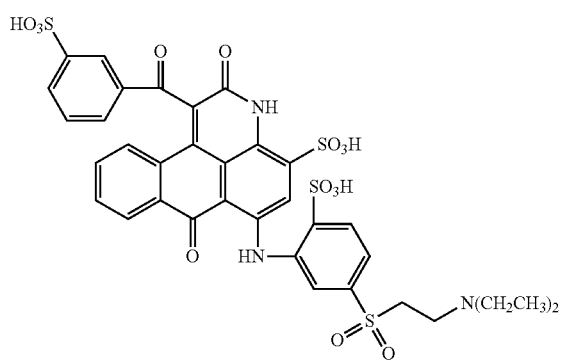

Embodiment 2

Prepare the sodium salt of the intermediate B1-2 by the same method as described in Embodiment 1. Replace 10% $SO_3.H_2SO_4$ at Step 2 with 12% $SO_3.H_2SO_4$, increase the temperature to 85-90° C., and obtain 2600 portions of solution containing 150 portions of the dye (sodium salt; B3 is its free sulfonic acid form). The maximum absorption wavelength of dye B3 in water is 527 nm. Mass spectrum (EI-MS) m/z (−): 251.1 ([$\underline{M}$-4H]$^{4-}$/5), 335.2 ([$\underline{M}$-3H]$^{3-}$/3), 1006.9 ([$\underline{M}$-H]$^{-1}$). The most abundant precise molecular mass (M) of dye B3 (calculated by free sulfonic acid) is 1007.9.

B3

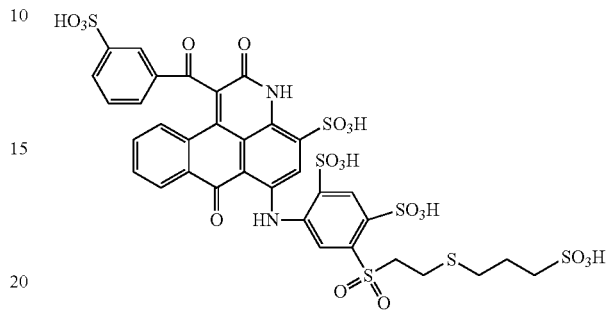

Prepare the sodium salt dye of B4 (B4 is its free sulfonic acid form) with B2-1 as the raw material by the same method as described above. The maximum absorption wavelength of the dye in water is 528 nm. Mass spectrum (EI-MS) m/z (−): 230.2 ([$\underline{M}$-4H]$^{4-}$/4), 307.3 ([$\underline{M}$-3H]$^{3-}$/3), 923.9 ([M-H]$^{-1}$). The most abundant precise molecular mass (M) of dye B4 (calculated by free sulfonic acid) is 925.0.

B4

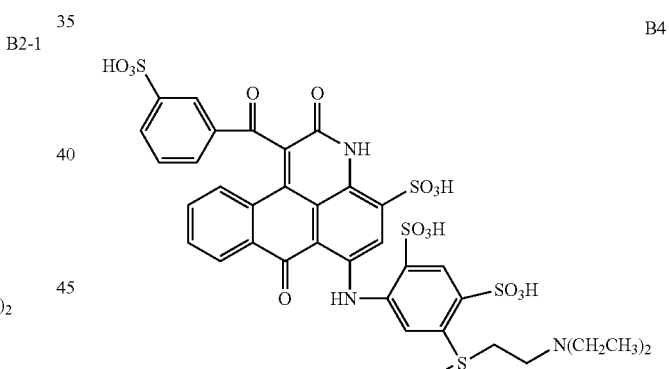

In the same process, prepare the intermediate sodium salt of formula B5-2 with raw material B5-1, and then obtain the mixture (weight ratio 2:1) sodium salt dyes of formula B5 and B6 (B5 and B6 are their free sulfonic acid form) after sulfonation. The maximum absorption wavelength of dye B5 in water is 536 nm. Mass spectrum (EI-MS) m/z (−): 262.4 ([M−3H]3−/3), 394.1 ([M−2H]2−/2), 789.0 ([M-H]−1). The most abundant precise molecular mass (M) of dye B5 (calculated by free sulfonic acid) is 790.0. The maximum absorption wavelength of dye B6 in water is 528 nm. Mass spectrum (EI-MS) m/z (−): 289.0 ([M−3H]3−/4), 434.0 ([M−2H]2−/2), 869.0 ([M-H]−1). The most abundant precise molecular mass (M) of dye B6 (calculated by free sulfonic acid) is 870.0.

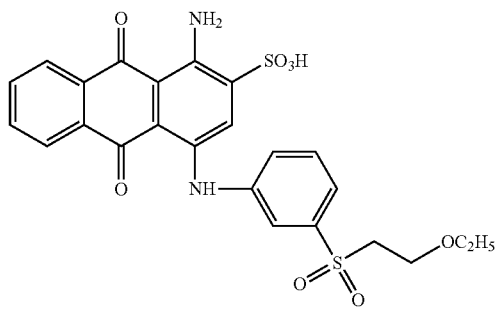

B5-1

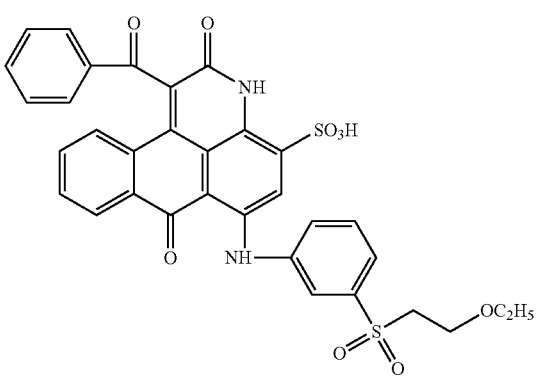

B5-2

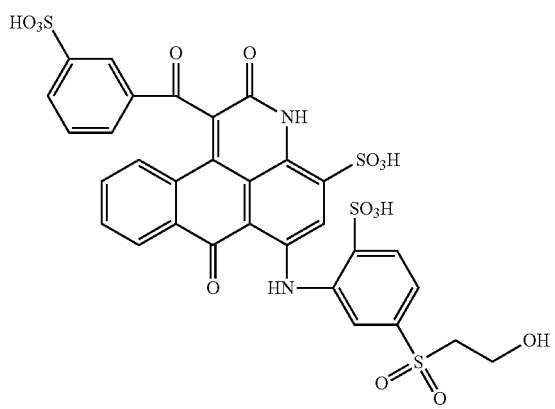

B5

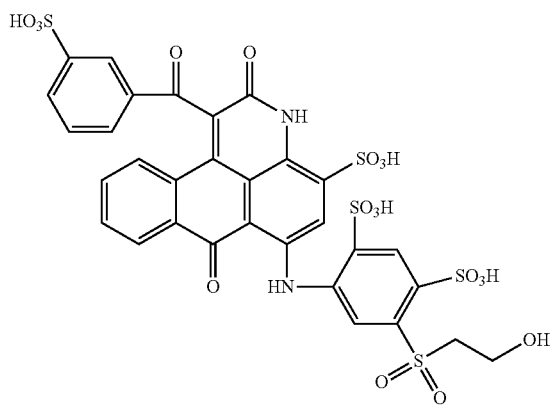

B6

Embodiment 3

(1) Add 60 portions of dimethyl sulfoxide to 210 portions of o-dichlorobenzene, and while stirring, add 122.5 portions of C.I. acid blue (in its form of sodium ionic salts), 3.0 portions of sodium carbonate and 144.0 portions of benzoyl ethyl acetate and heat the mixture up. React the mixture at 170 to 172° C. for 4 h, where water and ethanol produced as the byproducts during the reaction are discharged from the reaction system by azeotropic distillation; the color will gradually turns from blue to purple and determine the end of the reaction with a liquid chromatograph (about 4 h). Cool down the mixture to below 30° C. and add 300 portions of methanol and stir it for 30 min; filter and separate out the precipitates, wash with 200 portions of methanol and dry the precipitates to obtain 130 portions of pink purple crystalline dye (sodium salt, C1-1 is its free sulfonic acid form). The maximum absorption of the intermediate in water is 546 nm; mass spectrum: 521.1 ([$\underline{M}$-H]$^{-1}$). The most abundant precise molecular mass ($\underline{M}$) of the intermediate dye product C1-1 (calculated by free sulfonic acid) is 522.1.

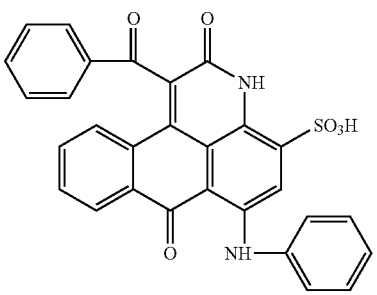

C1-1

(2) After the mixture cools down, add 450 portions of 50% fuming sulphuric acid to 500 portions of 95.0% sulfuric acid while stirring to obtain 950 portions 12% fuming sulphuric acid. Add 165 portions of sodium salt of the above-mentioned intermediate C1-1 to the prepared fuming sulphuric acid at a temperature not higher than 40° C. and then heat the mixture up for sulfonation at 85-90° C. for 3 h. Cool the reaction liquid down, slowly pour it into 1,200 portions of ice water while stirring, and add ice to maintain the liquid temperature below 40° C. Add water to bring the liquid volume to 1,500 portions, and filter out the insolubles. Add hot water to the mother liquor to bring the liquid volume to 2,000 portions and maintain the temperature between 40° C. to 45° C.; add 200 portions of sodium chloride and stir the liquid for 1 h, and filter and separate the precipitated crystals. Wash the obtained crystals with 600 portions of 20% sodium chloride aqueous solution and fully press the crystals dry to obtain 230 portions of head product, C1 wet cake. Dissolve the wet cake into 1,500 portions of water and heat the liquid to 40-45° C.; add 300 portions of sodium chloride, stir the liquid for 1 h and filter to obtain crystals of red dye C1; dry the crystals to obtain 150 portions of red dye Cl (sodium salt, Cl is its free sulfonic acid form). The maximum absorption wavelength of the dye in water is 541 nm. Mass spectrum (EI-MS) m/z (−): 253.1 ([$\underline{M}$-3H]$^{3-}$/3), 380.1 ([$\underline{M}$-2H]$^{2-}$/2), 760.9 ([$\underline{M}$-H]$^{-1}$). The most abundant precise molecular mass ($\underline{M}$) of dye C1 (calculated by free sulfonic acid) is 762.0.

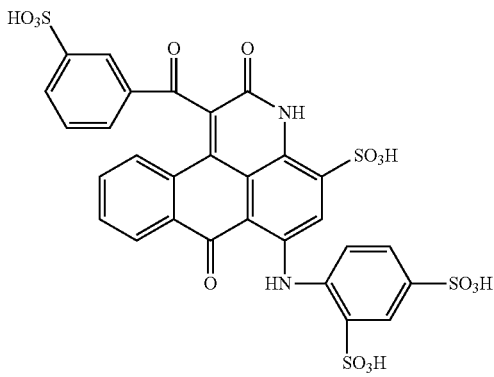

C1

Embodiment 4

Replace the 210 portions of o-dichlorobenzene with dimethylbenzene at Step (1) of Embodiment 3, and conduct the cyclization reaction at 140° C. to 145° C. for 8 h with other conditions the same as Embodiment 3 to obtain 130 portions light purple crystals C1-1 dye (sodium salt, C1-1 is its free sulfonic acid form). The maximum absorption of the dye in water is 546 nm; mass spectrum (EI-MS) m/z (–): 521.1 ([M-H]$^{-1}$). The most abundant precise molecular mass (M) of dye B4 (calculated by free sulfonic acid) is 522.1.

Embodiment 5

Prepare sodium salt dyes of formula C2, C3 and C4 from different raw materials correspondingly by methods similar to that of Embodiment 3; the general formula of their structures in the form of free sulfonic acids is as formula c and their specific structures are of Table 6.

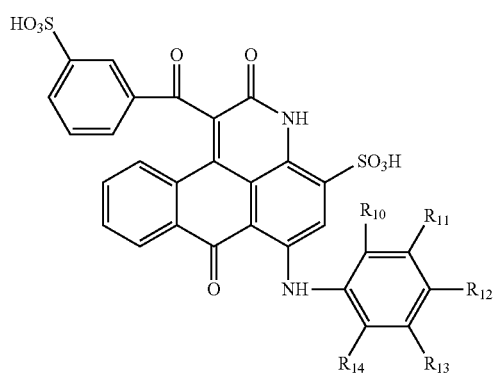

C

TABLE 6

| Dyes | Raw materials | $R_{10}$ | $R_{11}$ | $R_{12}$ | $R_{13}$ | $R_{14}$ |
|---|---|---|---|---|---|---|
| C1 | C.I. Acid Blue 25 | SO$_3$H | H | SO$_3$H | H | H |
| C2 | C.I. Acid Blue 27 | H | SO$_3$H | CH$_3$ | H | SO$_3$H |
| C3 | C.I. Acid Blue 129 | CH$_3$ | SO$_3$H | CH$_3$ | H | CH$_3$ |
| C4 | C.I. Acid Blue 230 | H | SO$_3$H | CH$_2$CH$_2$CH$_2$CH$_3$ | H | SO$_3$H |

Embodiment 6

(1) Add 60 portions of dimethyl sulfoxide to 210 portions of o-dichlorobenzene, and while stirring, add 142.2 portions of C.I. acid blue 324 (sodium salt), 3.6 portions of sodium carbonate and 135.0 portions of benzoyl ethyl acetate and heat the mixture up. React the mixture at 175 to 180° C. for 6 h, where the byproducts produced during the reaction are discharged from the reaction system by azeotropic distillation; the color will gradually turns from blue to purple and determine the end of the reaction with a liquid chromatograph (about 6 h). Cool down the mixture to below 30° C. and add 300 portions of isopropanol and stir it for 30 min; filter and separate out the precipitates, wash the filter cake with 400 portions of isopropanol and dry the filter cake to obtain 155 portions of pink purple crystalline C5-1 dye (sodium salt, C5-1 is its free sulfonic acid form). The maximum absorption of the dye in water is 535 and 560 nm; mass spectrum (EI-MS) m/z (–): 578.1 ([M-H]$^{-1}$). The most abundant precise molecular mass (M) of the intermediate C5-1 (calculated by free sulfonic acid) is 579.1.

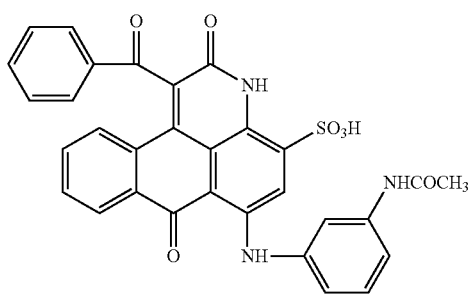

C5-1

(2) Slowly add 270.0 portions of 50.0% fuming sulphuric acid to 300 portions of 95.0% sulfuric acid while stirring and cooling the liquid down to prepare 570 portions of 12% fuming sulphuric acid. Cool down the obtain fuming sulphuric acid to 50° C. with water, add 96 portions of sodium salt of the above-mentioned intermediate C5-1 and heat it up. Conduct sulfonation reaction at 85-90° C. for 4 h. Cool the reaction liquid down, slowly pour it into 720 portions of ice water while stirring, and maintain the liquid temperature below 40° C. Add water to bring the liquid volume to 960 portions, and filter out the insolubles. Add ice to bring the liquid volume to 12,00 portions and maintain the temperature between below 40° C.; add 120 portions of sodium chloride and stir the liquid for 1 h, and filter and separate the precipitated crystals. Wash the obtained crystals with 500 portions of 20% sodium chloride aqueous solution and fully press the crystals dry to obtain 133.2 portions of head product wet cake. Dissolve the wet cake into 600 portions of water, add 90 portions of sodium chloride, stir the liquid for 2 h and filter to obtain crystals of red dye Cl; dry the crystals to obtain 90 portions of red dye C5. The maximum absorption wavelength of dye C5 in water is 528 nm. Mass spectrum (EI-MS) m/z (–): 272.1 ([M-3H]$^{3-}$/3), 407.9 ([M-2H]$^{2-}$/2), 419.5 ([M-3H+ Na]$^{2-}$/2), 420.5 ([M-4H+2Na]$^{2-}$/2). The most abundant precise molecular mass (M) of the dye (calculated by free sulfonic acid) is 819.0.

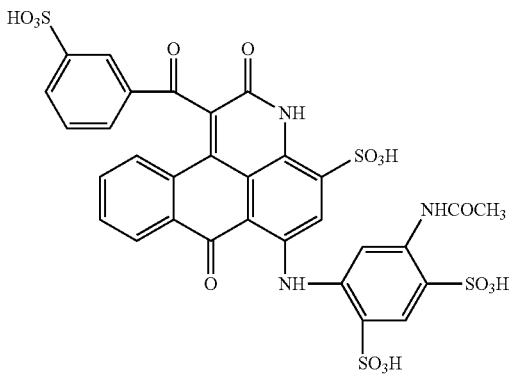

C5

Embodiment 7

Prepare sodium salt dyes of formula C6, C7 and C8 from different raw materials correspondingly by methods similar to that of Embodiment 6; the general formula of their structures in the form of free sulfonic acids is as formula c and their specific structures are of Table 7.

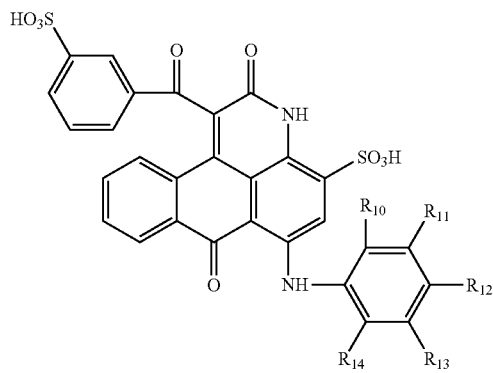

c

TABLE 7

| Dyes | Raw materials | $R_{10}$ | $R_{11}$ | $R_{12}$ | $R_{13}$ | $R_{14}$ |
|---|---|---|---|---|---|---|
| C5 | C.I. Acid Blue 324 | H | NHCOCH$_3$ | SO$_3$H | H | SO$_3$H |
| C6 | C.I. Acid Blue 182 | H | N(CH$_3$)COCH$_3$ | SO$_3$H | H | SO$_3$H |
| C7 | C.I. Acid Blue 40 | H | SO$_3$H | NHCOCH$_3$ | H | SO$_3$H |
| C8 | C.I. Acid Blue 41 | H | SO$_3$H | N(CH$_3$)COCH$_3$ | H | SO$_3$H |

Embodiment 8

(1) Prepare sodium salt of formula C5-1 as per step 1 of Embodiment 6.

(2) Slowly add 270.0 portions of 50.0% fuming sulphuric acid to 300 portions of 95.0% sulfuric acid while stirring and cooling the liquid down to prepare 570 portions of 12% fuming sulphuric acid. Cool down the obtain fuming sulphuric acid to 50° C. with water, add 96 portions of sodium salt of the above-mentioned intermediate C5-1 and heat it up. Conduct sulfonation reaction at 85-90° C. for 4 h. Cool the reaction liquid down, slowly pour it into 720 portions of ice water while stirring, and maintain the liquid temperature below 50° C. Add water to bring the liquid volume to 960 portions, and filter out the insolubles. Add ice to bring the liquid volume to 1,200 portions, and maintain the temperature between 60° C. and 65° C. for hydrolyzation. Add 120 portions of sodium chloride and stir the liquid for 2 h, and filter and separate the precipitated crystals. Wash the obtained crystals with 500 portions of 20% sodium chloride aqueous solution and fully press the crystals dry to obtain 133.2 portions of head product wet cake. Dissolve the wet cake into 600 portions of water, add 90 portions of sodium chloride, stir the liquid for 2 h and filter to obtain crystals of red dye; dry the crystals to obtain 93 portions of red dye crystals C5-NH$_2$ (sodium salt, C1C5-NH$_2$ is its free sulfonic acid form). The maximum absorption wavelength of the dye in water is 545 nm. Mass spectrum (EI-MS) m/z (–): 258.1 ([$\underline{M}$-3H]$^{3-}$/3), 387.5 ([$\underline{M}$-2H]$^{2-}$/2), 776.0 ([$\underline{M}$-H]$^{-1}$). The most abundant precise molecular mass ($\underline{M}$) of dye B4 (calculated by free sulfonic acid) is 777.0.

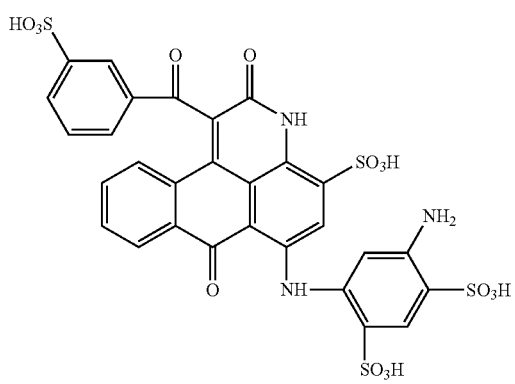

C5-NH$_2$ (3) Add 67.7 portions of sodium salt wet cake of the above-mentioned C5-NH$_2$ compound into 60 portions of water, add 25% sodium hydroxide (about 24 portions) while stirring, and adjust pH to 3-4 to dissolve the system. Drip and dissolve 0.4 portions of anionic emulsifier into 60 portions of ice water, add 8.9 portions of cyanuric chloride, and stir for 30 min; transfer the obtained suspension into the above-mentioned C5-NH$_2$ compound solution, drip 10% NaOH aqueous solution, maintain the pH value between 2.7 to 3 at 25° C. to 30° C. for 3 h to obtain the one-time condensation reaction liquid containing sodium salt of the intermediate C$_5$—Cl$_2$(C$_5$—Cl$_2$ is its free acid form). The maximum absorption wavelength of the dye in water is 520 nm. Mass spectrum (EI-MS) m/z (–): 230.0, 230.5 ([$\underline{M}$-4H]$^{4-}$/4), 235.5 and 236.0 ([$\underline{M}$-5H+ Na]$^{4-}$/4), 241.0, 241.5 ([$\underline{M}$-6H+2Na]$^{4-}$/4), 321.6, 322.3 ([$\underline{M}$-5H+2Na]$^{3-}$/3, 329.0, 329.6 ([$\underline{M}$-6H+3Na]$^{3-}$/3, 505.0, 506.0 ([$\underline{M}$-6H+4Na]$^{2-}$/2. The most abundant precise molecular mass ($\underline{M}$) of the dye (calculated by free sulfonic acid) is 923.9 and 925.9.

C5-Cl₂

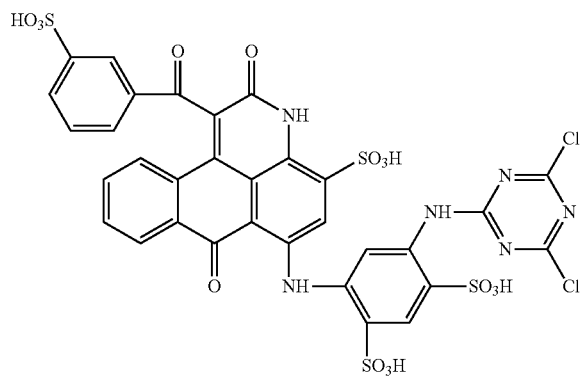

(4) Add ice to adjust the reaction liquid containing the above-mentioned C5-Cl₂ to adjust its temperature to 5° C. Drip 25% sodium hydroxide aqueous solution to adjust the pH value to 9. Add 15.4 portions of 5-hydroxy sodium m-phthalate and 25% sodium hydroxide aqueous solution to adjust the pH value to 9 and form the aqueous solution. In the above-mentioned reaction liquid at 5° C., add the 5-hydroxy m-phthalic ester aqueous solution within 30 min. Keep adding ice and sodium hydroxide aqueous solution to maintain the pH value at 9.0±0.3, raise the temperature to 27-30° C. for reaction for 1 h at the above temperature and pH value; conduct the reaction at 40-45° C. for 1 h and then raise the temperature to 87-93° C. for reaction for 1 h. After the reaction, add water to adjust the liquid volume to about 350 portions and then filter out the insolubles. Add water to adjust the liquid volume to 400 portions, maintain the temperature at 65±2° C., add concentrated hydrochloric acid to adjust the pH value to 3, add 40 portions of table salt within 15 min and stir for 1 h; filter out the precipitated product salt, and wash with 150 portions of 20% sodium chloride aqueous solution to obtain red wet cake. Add the above-mentioned wet cake to 1,000 ml of water, remove the inorganic salts by reverse osmosis membrane to obtain D1 dye (sodium salt, D1 is its free sulphonic acid form). The maximum absorption wavelength of dye D1 in water is 529 nm. Mass spectrum (EI-MS) m/z (−): 242.2 ([$\underline{M}$-5H]$^{5-}$/5), 303.0 ([$\underline{M}$-4H]$^{4-}$/4), 404.3 ([$\underline{M}$-3H]$^{3-}$/3), 607.0 ([$\underline{M}$-2H]$^{2-}$/2). The most abundant precise molecular mass ($\underline{M}$) of dye B1 (calculated by free sulfonic acid) is 1216.0.

Embodiment 9

(1) Prepare reaction liquid containing C5-Cl₂ by following the steps of Embodiment 8.

(2) Add ice to adjust the above-mentioned reaction liquid containing C5-Cl₂ to adjust its temperature to 5° C. Drip 25% sodium hydroxide aqueous solution to adjust the pH value to 9. Add 7.7 portions of 5-hydroxy sodium m-phthalate compound and 25% sodium hydroxide aqueous solution to adjust the pH value to 9 and form the aqueous solution. In the above-mentioned reaction liquid at 5° C., add the 5-hydroxy sodium m-phthalate aqueous solution within 30 min. Keep adding ice and sodium hydroxide aqueous solution to maintain the temperature at 5-10° C. and the pH value at 9.0±0.3, Raise the temperature to 27-30° C. for reaction for 1 h, and then raise the temperature to 40-45° C. for reaction for 1 h with the pH value at 9.0±0.3. Add 1.2 portions of diethanolamine (A₂ in general formula III), maintain the pH value at 8.7-9.3 with sodium hydroxide aqueous solution and the temperature at 87-93° C. for reaction for 1 h. After the reaction, add water to adjust the liquid volume to about 350 portions and then filter out the insolubles. Add some water to adjust the liquid volume to 400 portions, maintain the temperature at 65±2° C., add concentrated hydrochloric acid to adjust the pH value to 3, add 40 portions of table salt within 15 min and stir for 1 h; filter out the precipitated product salt, and wash with 150 portions of 20% table salt aqueous solution to obtain red wet cake. Add the above-mentioned wet cake to 1,000 ml of water, remove the inorganic salts by reverse osmosis membrane to obtain D2 sodium salt dye (D2 is its free sulfonic acid form) with a maximum absorption wavelength of 529 nm (in aqueous solution). Mass spectrum 9EI-MS) m/z(−): 283.8 ([$\underline{M}$-4H]$^{4-}$/4), 378.7 ([$\underline{M}$-3H]$^{3-}$/3), 563.5 ([$\underline{M}$-2H]$^{2-}$/2). The most abundant precise molecular mass ($\underline{M}$) of dye D2 (calculated by free sulfonic acid) is 1139.1.

D2

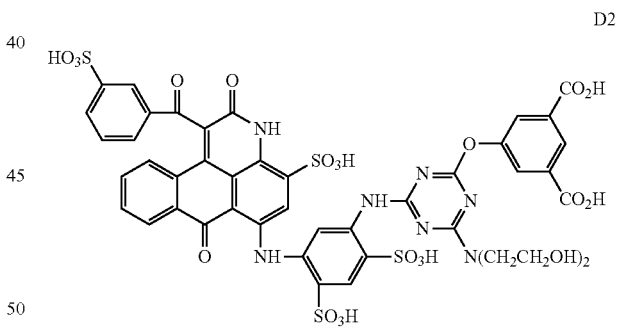

D1

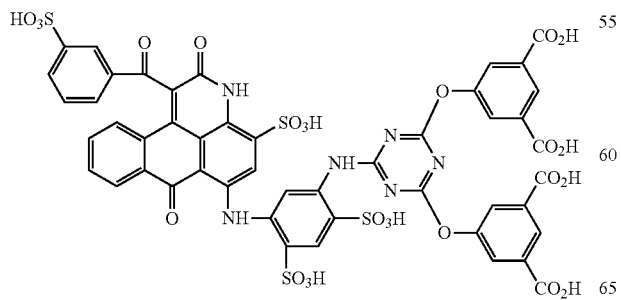

Embodiment 10

(1) Prepare sodium salt dye of formula C7-NH₂ (C7-NH₂ is its free acid form) with dye C8 (see Table 7 of Embodiment 7) by following Step 2 the method involved of Embodiment 8, which is a red dye wet cake.

(2) Prepare the one-time condensation reaction liquid containing sodium salt of the intermediate C7-Cl₂ (its free acid form) by following Step 3 and the method involved of Embodiment 8.

C7-NH2

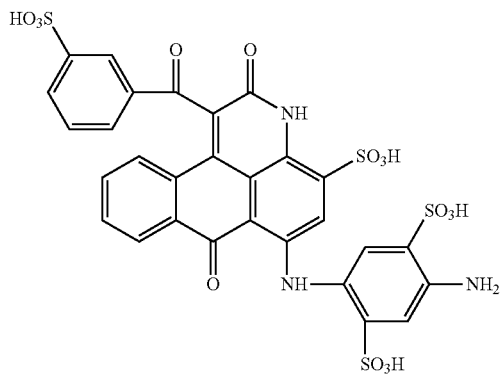

Embodiment 11

Dissolve 7.8 portions of sodium salt of dye C5-NH$_2$ into 80 portions of water, add 2.1 portions of p-toluenesulfonyl chloride and react the mixture at 40° C. while rapidly stirring; adjust pH<8 with 20% NaOH solution, and after the pH is constant, desalt the liquid in the high-pressure reverse osmosis membrane system to obtain D4 (its free sulphonic acid form) sodium salt dye. The maximum absorption wavelength of the dye in aqueous solution is 528 nm. Mass spectrum 9EI-MS) m/z(−): 231.8 ([$\underline{M}$-4H]$^{4-}$/4), 309.3 ([$\underline{M}$-3H]$^{3-}$/3), 464.5 ([$\underline{M}$-2H]$^{2-}$/2). The most abundant precise molecular mass ($\underline{M}$) of dye D4 (calculated by free sulfonic acid) is 931.0.

C7-Cl$_2$

D4

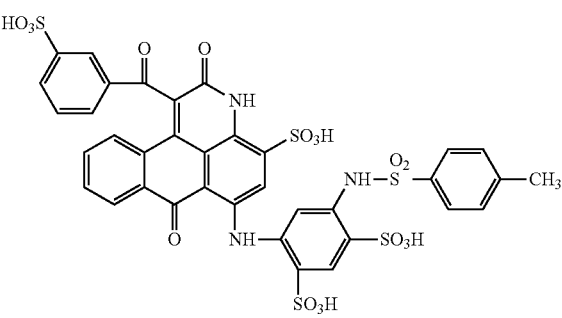

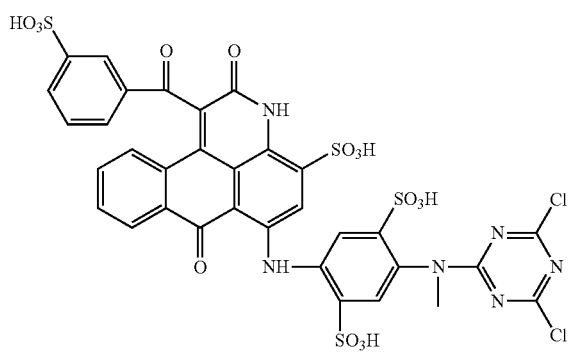

Embodiment 12

(A) Preparation of Inks

Prepare the ink composition of Table 8 with the product obtained in Embodiment 1-11 as the coloring agent, and filter the ink composition with 0.45 μm membrane filter to obtain the magenta ink composition of the present invention. Add ion exchange water and triethanolamine to adjust the pH value of the ink composition to 8-10 and the weight to 100 portions. By the same methods, prepare ink compositions with control sulfonic-group-free anthrone dyes Dye1 and Dye2, hydrolytic derivatives of commercial dye C.I. reactive red 180 (reactive red 180 for short) and C.I. direct red 227 for comparison.

(3) Prepare sodium salt of formula D3 (its free acid form) with C7-Cl$_2$ by following step 2 and the conditions involved in Embodiment 9. The maximum absorption wavelength of dye D3 in water is 545 nm. Mass spectrum 9EI-MS) m/z(−): 287.3 ([$\underline{M}$-4H]$^{4-}$/4), 383.3 ([$\underline{M}$-3H]$^{3-}$/3), 570.5 ([$\underline{M}$-2H]$^{2-}$/2). The most abundant precise molecular mass ($\underline{M}$) of dye D3 (calculated by free sulfonic acid) is 1153.1.

D3

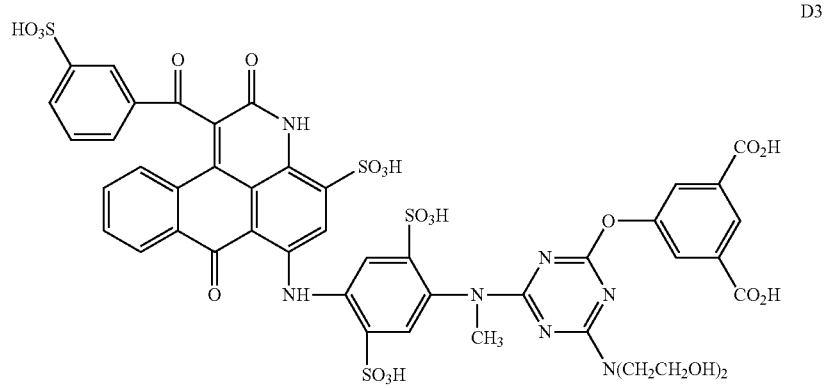

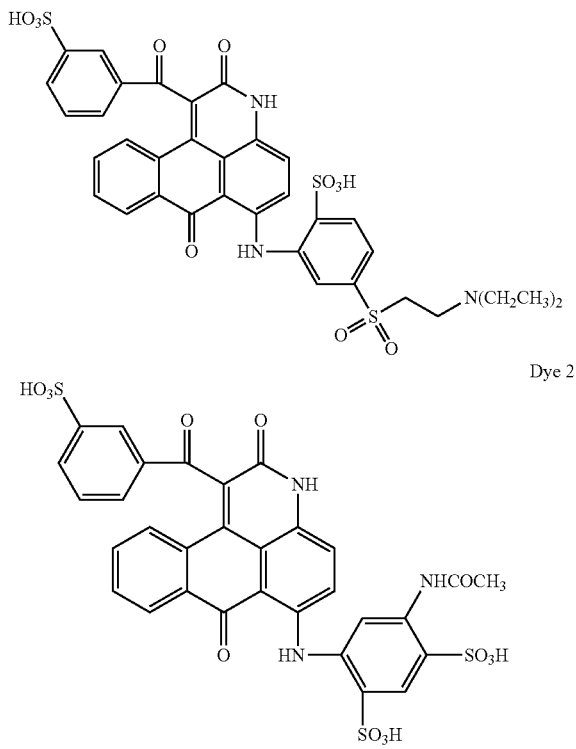

TABLE 8

| Composition | Weight portion |
| --- | --- |
| Dyes | 6 |
| Glycerine | 5 |
| Urea | 5 |
| 2-pyrrolidone | 4 |
| Ethylene glycol monobutyl ether | 2 |
| Isopropanol | 3 |
| Non-ionic surfactant OP-10 | 0.2 |
| Triethanolamine (for adjustment of pH) | 0.2 |
| EDTA | 0.1 |
| Fungicide | 0.01 |
| Deionized water | To add the weight to 100 portions. |

(B) Ink-Jet Printer

Use an ink-jet printer (Epson 270 manufactured by Epson Company), glossy photo paper (Epson) and the above described ink compositions for ink-jet printing.

(C) Evaluation of Ink-Jet Printed Images:

(1) Printed Images Light Resistance Test with Xenon Lamp

Irradiate the printed glossy photo paper manufactured by Canon and Epson with Xenon-lamp Weathering Test Chamber ZG-P (manufactured by China Surui Company) at 60% RH and 24° C. with illuminance of 0.36 W/m² for 50 h to test the color difference (ΔE) before and after the test. The color difference (ΔE) is calculated from the differences of values of L*, a*, b* before and after the test in the above described color measurement system (Unterlab) by the followings formula:

$$\Delta E = ((\text{difference of } L^*)^2 + (\text{difference of } a^*)^2 + (\text{difference of } b^*)^2)^{1/2}.$$

Three grades will be divided for the evaluation based on the following benchmark:
ΔE<10 ○
ΔE<20 Δ
ΔE>20 x (2) Gas Resistance of the Printed Images Place the printed images in the Ozone Weathering Test Chamber (manufactured by China Surui Company) at 60% RH, 24° C. and 40 ppm ozone. Calculated the color difference (ΔE) before and after the test by the same method as described in (1) above and evaluate it in 3 grades based on the following benchmark:
ΔE<10 ○
ΔE<20 Δ
ΔE>20 x (3) Wet Resistance of the Printed Images Place the printed images in the Constant Temperature and Humidity Chamber (manufactured by China Surui Company) at 50° C. and 90% RH for 168 h; judge the bleeding of the ink by bare eyes before and after the test and evaluate it in 3 grades based on the following benchmark:
No bleeding ○
Slight bleeding Δ
Notable bleeding x (D) Evaluation of Solubility and Solution Stability Heat and dissolve the system of 20 portions of dyes, 70 portions of water and 10 portions of ethylene glycol; after the solution cools down, store it airtight at a constant temperature of 50° C. for 7 d; cool it down and store it at 0° C. for 7 d; filter the solution and evaluate it in 3 grades based on the following benchmark:
No precipitation ○
Slight precipitation Δ
Notable x All the test results are listed in Table 9.

TABLE 9

Comparison of test performance

| Dyes used | UV resistance of printed images | Ozone resistance of printed images | Water resistance of printed images | Solubility and stability of dyes in aqueous solvent system |
| --- | --- | --- | --- | --- |
| B1 | ○ | ○ | ○ | ○ |
| B2 | ○ | ○ | ○ | ○ |
| B1 + B2 (1:4 weight ratio) | ○ | ○ | ○ | ○ |
| B3 | ○ | ○ | ○ | ○ |
| B4 | ○ | ○ | ○ | ○ |
| B5 + B6 (2:1 weight ratio) | ○ | ○ | ○ | ○ |
| C1 | ○ | ○ | ○ | ○ |
| C2 | ○ | ○ | ○ | ○ |
| C3 | ○ | Δ | ○ | ○ |
| C4 | ○ | Δ | ○ | Δ |
| C5 | ○ | ○ | ○ | ○ |
| C6 | Δ | Δ | ○ | ○ |
| C7 | ○ | ○ | ○ | ○ |
| C8 | Δ | Δ | ○ | ○ |
| D1 | ○ | ○ | ○ | ○ |
| D2 | ○ | ○ | ○ | ○ |
| D3 | ○ | Δ | ○ | ○ |
| D4 | ○ | Δ | ○ | Δ |
| Dye1 | Δ | Δ | ○ | Δ |
| Dye2 | Δ | Δ | ○ | Δ |
| C.I. reactive red 180 | x | x | Δ | Δ |
| C.I. direct red 227 | x | x | Δ | Δ |

The comparison shows that anthrapyridone sulfonic acid dyes of the present invention have extremely excellent solubility and stability for use in inkjet inks, and images printed with its inkjet ink compositions have outstanding light resistance, ozone resistance and moisture resistance.

Industrial Applicability

The anthrapyridone sulfonic acid compounds of formula (1) of the present invention are featured by high solubility and stability in water and lustre and brightness suitable for ink-jet printing. As magenta ink compositions prepared with these compounds have outstanding storage stability and images printed with the ink are featured by outstanding light resistance, ozone resistance and moisture resistance, these compounds are magenta dyes suitable for ink-jet printing.

What is claimed is:

1. A class of compounds of general formula (I) and its salts of general formula (II)

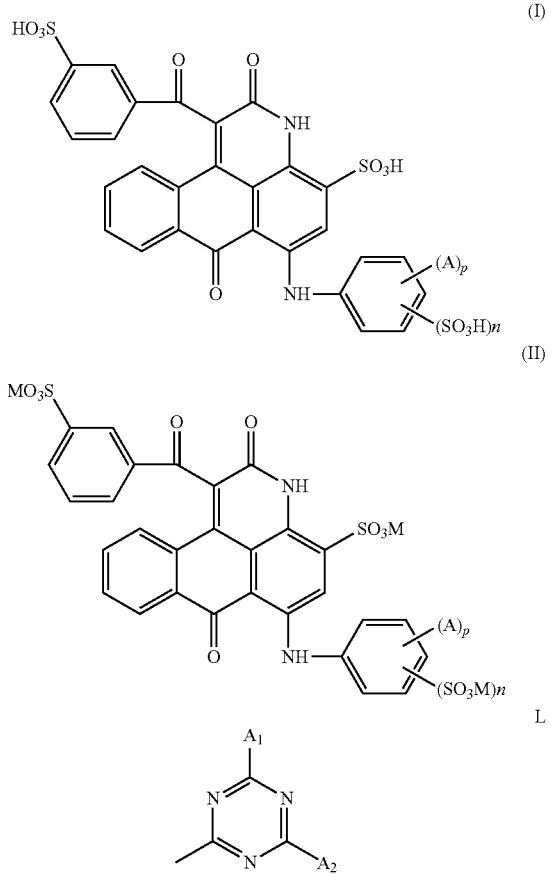

wherein in the general formula (I) and (II), substituents $(A)_p$ and $(SO_3H)_n$ are at the ortho, meta or para position of the benzene ring with n of 0-2 and p of 0-3; M is selected from the group consisting of $Li^+$, $Na^+$, $K^+$, $NH_4^+$ and organic ammonium salt $N^+R_1R_2R_3R_4$, of which $R_1$, $R_2$, $R_3$, $R_4$ are the same or different H, $C_{1-18}$ alkyl group, cyclohexyl group, $CH_2CH_2OH$, $CH(CH_3)CH_2OH$ or benzyl group;

wherein p>0, A is the same or different groups selected from the group consisting of: H, CN, $NO_2$, $NH_2$, F, Cl, Br, $C_{1-18}$ alkyl group, cyclohexyl group, phenyl group, benzyl group, phenoxy, $C_{1-18}$ alkoxy group, $C_{1-18}$ alkylthio group, $SO_2CH=CH_2$, $SO_2CH_2CH_2A_1$, $NR_6COR_5$, $NR_6SO_2R_5$, and $NR_6$-L;

wherein, $A_1$ stands for groups comprising at least one of O, S, and N;

$R_5$ stands for $C_{1-18}$ alkyl group, phenyl group, tolylene, benzyl group, $CF_3$, or $(C_6H_{5-m})(CO_2M)_m$, of which m is 0-3, $(C_6H_{5-m})(CO_2M)_m$ is a benzene ring with m number of $CO_2M$ substituents which may be at any position of the benzene ring;

$R_6$ stands for H, $C_{1-4}$ alkyl group or $CH_2CH_2OH$;

wherein $A_2$ and $A_1$ in general formula L have the same definition but $A_2$ and $A_1$ in general formula L can each be the same or different compounds.

2. The compounds or their salts as described in claim 1, wherein said organic ammonium salt $N^+R_1R_2R_3R_4$ is selected from the group consisting of monoethanolamine salt, diethanolamine salt, triethanolamine salt, monoisopropanolamine salt, diisopropanolamine salt and triispropanolamine salt.

3. The compounds or their salts as described in claim 1, wherein M is selected from the group consisting of $Li^+$, $Na^+$ and $NH_4^+$.

4. The compounds or their salts as described in claim 1, wherein $A_1$ stands for $OR_7$, $OSO_3M$, $O(C_6H_{5-m})(CO_2M)_m$, $O(C_6H_{5-m})(SO_3M)_m$, $O(C_{10}H_{7-m})(CO_2M)_m$, $O(C_{10}H_{7-m})(SO_3M)_m$, $N(R_6)_2$, $NR_6R_7$, $N(R_6)(C_6H_{5-m})(CO_2M)_m$, $N(R_6)(C_6H_{5-m})(SO_3M)_m$, $N(R_6)(C_{10}H_{7-m})(CO_2M)_m$, $N(R_6)(C_{10}H_{7-m})(SO_3M)_m$, $SR_7$, $S(C_6H_{5-m})(CO_2M)_m$, $S(C_6H_{5-m})(SO_3M)_m$, $S(C_{10}H_{7-m})(CO_2M)_m$ or $S(C_{10}H_{7-m})(SO_3M)_m$;

where, $R_7$ is H, $C_{1-18}$ alkyl group, cyclohexyl group, $CH_2CH_2OH$, $CH(CH_3)CH_2OH$, benzyl group, $CH_2CH_2SO_3M$, $CH_2CH_2CH_2SO_3M$, $CH_2CH_2CH_2CH_2SO_3M$, $CH_2CH_2CO_2M$, $CH_2CH_2CH_2CO_2M$, $CH_2CH_2CH_2CH_2CO_2M$, or $CH_2CH_2CH_2CH_2CH_2CO_2M$;

wherein, $(C_6H_{5-m})(SO_3M)m$ is a benzene ring with m number of $SO_3M$ substituents which can be at any position of the benzene ring; $(C_{10}H_{7-m})(CO_2M)m$ is a naphthalene ring with m number of $CO_2M$ substituents and $(C_{10}H_{7-m})(SO_3M)_m$ is a naphthalene ring with m number of $SO_3M$ substituents, wherein the substituents $CO_2M$ or $SO_3M$ can be at any position of the naphthalene ring, wherein $R_6$ and m are defined the same as claim 1.

5. A compound of general formula (III), wherein $A_1$, $A_2$, $R_6$, M and n are defined the same as claim 1:

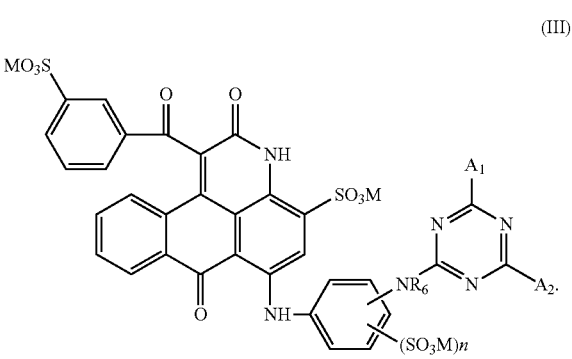

6. A method for preparing the compound of general formula (I) or its salt of general formula (II) in claim 1, wherein A is the same or different groups selected from the group consisting of: H, CN, $NO_2$, $NH_2$, F, Cl, Br, $C_{1-18}$ alkyl group, cyclohexyl group, phenyl group and benzyl group, phenoxy group, $C_{1-18}$ alkoxy group, $C_{1-18}$ alkylthio group, $SO_2CH=CH_2$, $SO_2CH_2CH_2A_1$, $NRCOR_5$, and $NRSO_2R_5$, the method comprising the following steps:

(1) cyclization: reacting raw materials of general formula (IV) with benzoyl ethyl acetate in organic solvents at 100° C.-250° C. for cyclization for 2-10 h to form a compound of general formula (V), wherein the organic solvents are those with boiling point of 100° C.-300° C. and capable of fully or partly solving the raw material (IV);

in the reaction, the byproducts water and ethanol are discharged from the reaction system under the condition of heating reflux or heating evaporation;

cooling the reaction system to 0-50° C. after the cyclization and filter the compound of general formula (V) separated out from the liquid reaction system to obtain the solid intermediate (V);

(2) sulfonation: sulfonating the compound of general formula (V) which is obtained at step 1 with fuming sulphuric acid $SO_3.H_2SO_4$ containing 5-30% of $SO_3$ or chlorosulfonic acid at 10° C.-100° C. for 1-4 h to obtain the compound of general formula (I);

(3) salting or salt conversion: sorting out or convert the compound of general formula (1) obtained at step (2) to form the salt of general formula (II):

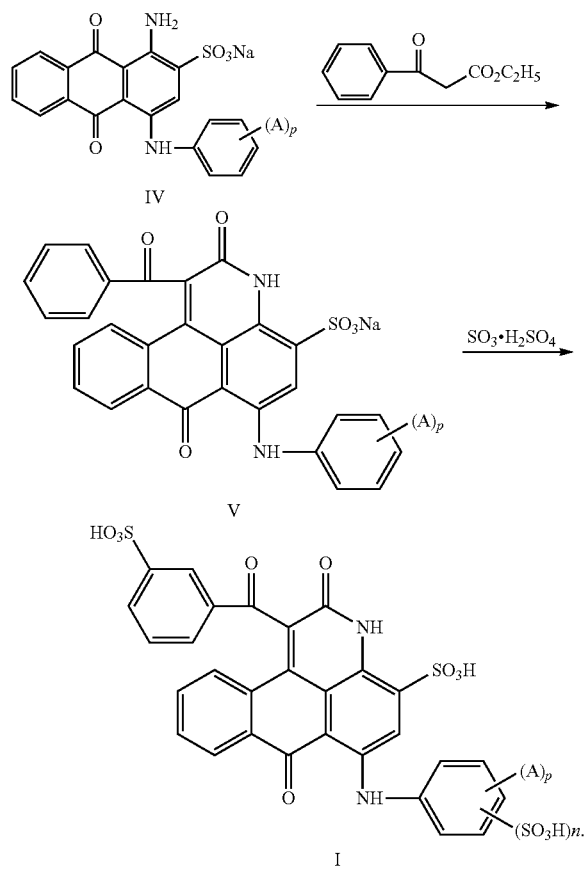

7. The method as described in claim 6, wherein the organic solvents utilised at step (1) are selected from the group consisting of dimethylbenzene, diethylbenzene, trimethylbenzene, chlorobenzene, dichlorobenzene, nitrobenzene, DMSO, DMF and their mixtures.

8. The method as described in claim 6, wherein a sub-step as the following is included at step (1) after the reaction system cools to 0-50° C.: adding organic solvents solving little of the intermediate (V) with a boiling point of 30° C.-150° C. to promote the separation of the intermediate (V).

9. The method as described in claim 8, wherein low-boiling point organic solvent is selected from the group consisting of methanol, ethanol, propanol, isopropanol, acetone, acetonitrile, petroleum ether, cyclohexane and their mixtures.

10. The method as described in claim 6, wherein inorganic salt is selected from the group consisting of ammonium chloride, sodium chlorideand and lithium chloride and is utilised in the salting out process at step (3) to form the compound of general formula (II).

11. A method for preparing the compound of general formula (III) of claim 5, wherein A in general formula (II) is $NR_6$-L, comprising the followings steps:

(1) blue anthraquinone sulfonic acid compounds of general formula (VI) are utilised to obtain compounds of general formula (VII)-(VIII) in turn by (1-a) reacting raw materials of general formula (VI) with benzoyl ethyl acetate in organic solvents at 100° C.-250° C. for cyclization for 2-10h to form a compound of general formula (VII), wherein the organic solvents are those with boiling point of 100° C.-300° C. and capable of fully or partly solving the raw material (VI);

in the reaction, the byproducts water and ethanol are discharged from the reaction system under the condition of heating reflux or heating evaporation;

cooling the reaction system to 0-50° C. after the cyclization and filter the compound of general formula (VII) separated out from the liquid reaction system to obtain the solid intermediate (VII);

(1-b) sulfonating the compound of general formula (VII) which is obtained at step 1-a with fuming sulphuric acid $SO_3.H_2SO_4$ containing 5-30% of $SO_3$ or chlorosulfonic acid at 10° C.-100° C. for 1-4h to obtain the compound of general formula (VIII);

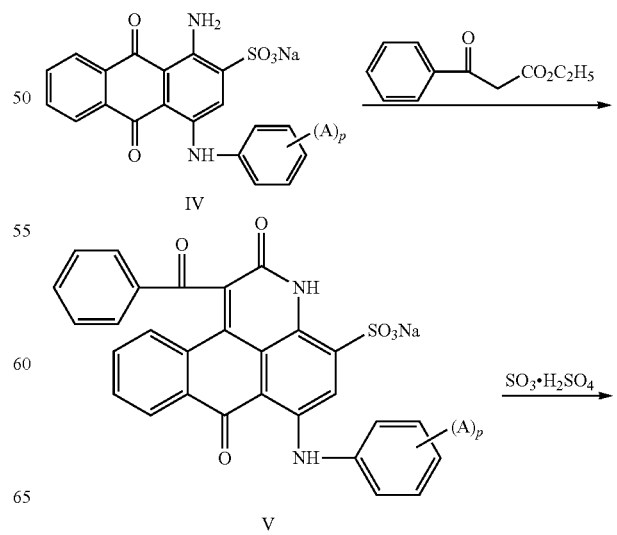

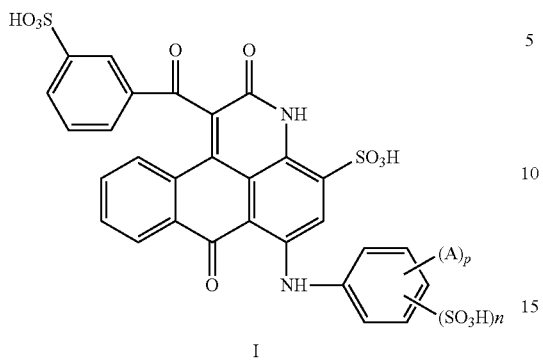

I (2) under acidic conditions of pH<4, heating the obtained compounds of general formula (VIII) to 30° C.-100° C. for hydrolysis to obtain the compound of general formula (VIII-NH2), salting out the resulting compounds with salts containing M cations to obtain the M salt form of the compound;

(3) reacting the obtained salt form of the compound of general formula (VIII -NH$_2$ ) with cyanuric chloride at 0-30° C. and pH 2-8 to obtain the compound of general formula (VIII-CI$_2$);

(4) reacting the compounds of general formula (VIII-CI$_2$) with HA$_1$ at pH 4-10 and 5° C.-50° C. to obtain the compound of general formula (VIII-A$_1$CI);

(5) reacting the compound of general formula (VIII-A$_1$CI) with HA$_2$ at pH 3-10 and 30° C.-100° C. to obtain the compound of general formula (III);

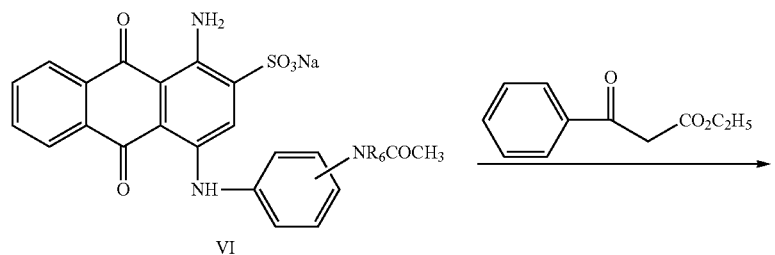

VI

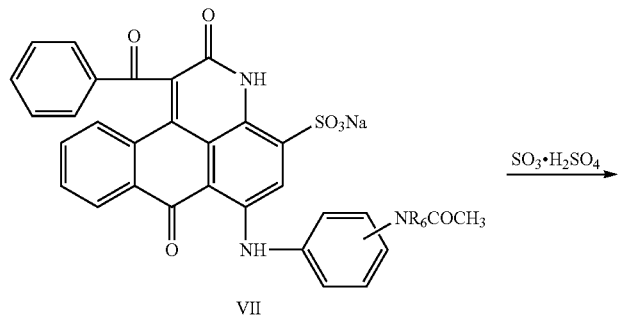

VII

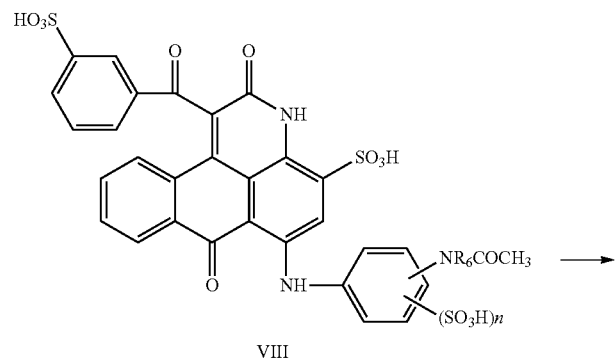

VIII

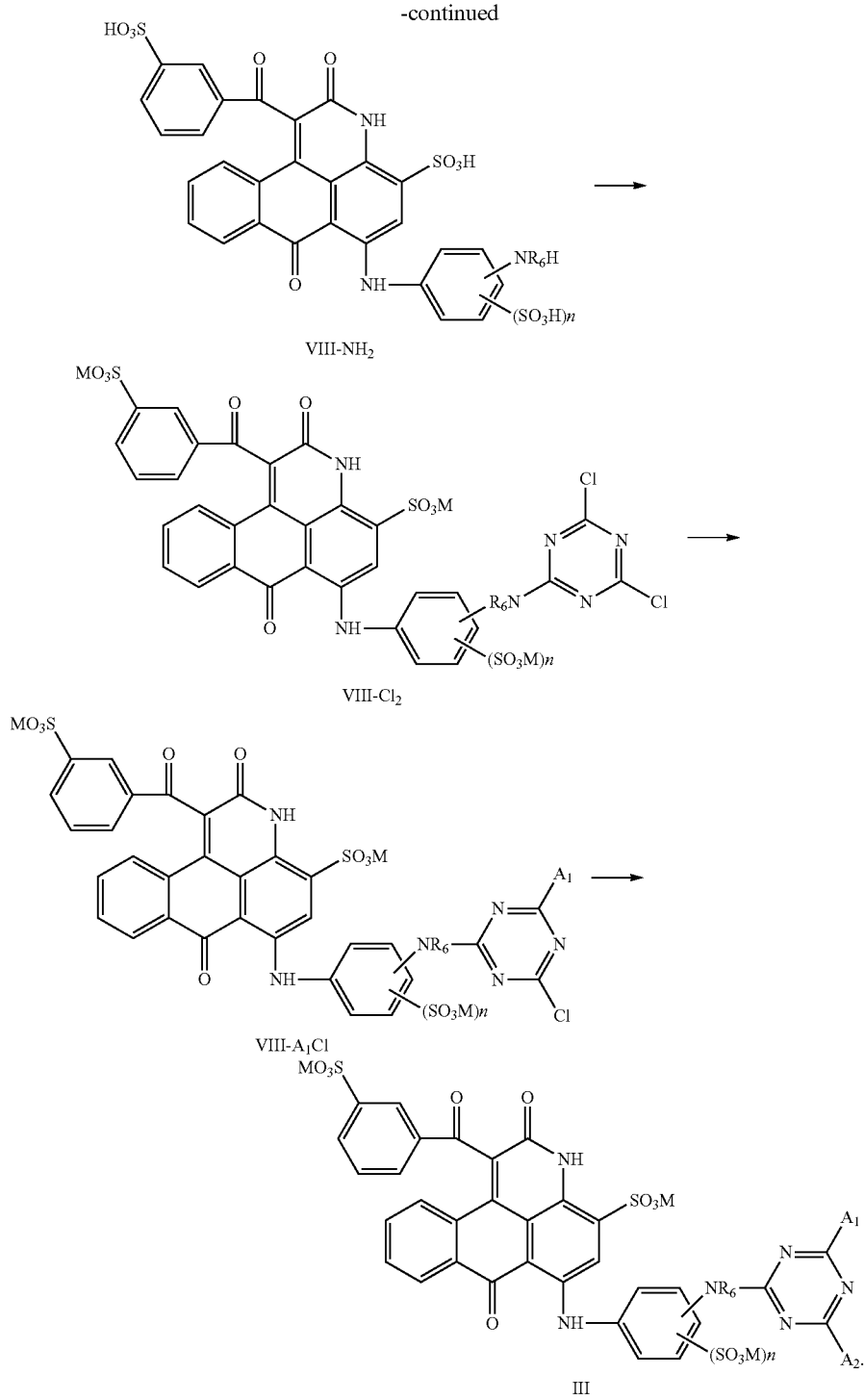

12. An ink comprising the compounds as described in claim 1, wherein said ink is printing ink, coating ink or inkjet ink and wherein said inkjet ink is water-based, solvent-based or aqueous solvent-based inkjet ink.

13. A composition of water-based inkjet ink consisting of 1-20% of the compounds or their salts as described in claim 1 by weight, 5-50% of organic solvents miscible with water by weight, and 30-94% of water by weight based on the total weight of the compound;

said water-miscible organic solvents comprise one or more of the following: ethanol, propanol, isopropanol, ethylene glycol, diethylene glycol, triethylene glycol, glycerol, ethylene glycol monobutyl ether, diethylene glycol monobutyl ether, triethylene glycol monobutyl ether, propylene glycol, butanediol, pentanediol, hexanediol, diglycerol, 2-pyrrolidone and N-methyl -2-pyrrolidone.

14. An application of the compounds as described in claim 1, wherein said application is a coloring agent for following material: inks, coatings, paints, laser print toners or markers.

15. An application of the compounds as described in claim 1, wherein said application is a coloring agent for following materials: paper, fabrics, woven fabrics, knitted fabrics, non-woven fabrics, glass, ceramics, polymers, rubber, plastic or fiber.

16. The application of the compounds as described in claim 5, wherein said application is a coloring agent for following material: inks, coatings, paints, laser print toners or markers.

17. The application of the compounds as described in claim 5, wherein said application is a coloring agent for following materials: paper, fabrics, woven fabrics, knitted fabrics, non-woven fabrics, glass, ceramics, polymers, rubber, plastic or fiber.

18. An ink comprising the compounds as described in claim 5, wherein said ink is printing ink, coating ink or inkjet ink and wherein said inkjet ink is water-based, solvent-based or aqueous solvent-based inkjet ink.

19. A water-based inkjet ink composition consisting of 1-20% of the compounds or their salts as described in claim 5 by weight, 5-50% of organic solvents miscible with water by weight, and 30-94% of water by weight based on the total weight of the compound;

said water-miscible organic solvents comprise one or more of the following: ethanol, propanol, isopropanol, ethylene glycol, diethylene glycol, triethylene glycol, glycerol, ethylene glycol monobutyl ether, diethylene glycol monobutyl ether, triethylene glycol monobutyl ether, propylene glycol, butanediol, pentanediol, hexanediol, diglycerol, 2-pyrrolidone and N-methyl -2-pyrrolidone.

* * * * *